United States Patent
Kim

(10) Patent No.: US 11,381,354 B2
(45) Date of Patent: Jul. 5, 2022

(54) METHOD AND APPARATUS FOR WIRELESS COMMUNICATION OF WIRELESS NODE IN WIRELESS COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/524,694

(22) Filed: Jul. 29, 2019

(65) Prior Publication Data

US 2020/0036484 A1 Jan. 30, 2020

(30) Foreign Application Priority Data

Jul. 27, 2018 (KR) .................. 10-2018-0088159
Aug. 21, 2018 (KR) .................. 10-2018-0097558

(51) Int. Cl.
*H04L 1/18* (2006.01)
*H04L 1/16* (2006.01)
*H04W 76/11* (2018.01)
*H04W 40/22* (2009.01)

(52) U.S. Cl.
CPC .............. *H04L 1/1867* (2013.01); *H04L 1/16* (2013.01); *H04W 40/22* (2013.01); *H04W 76/11* (2018.02)

(58) Field of Classification Search
CPC ..... H04L 1/1867; H04W 76/11; H04W 40/22; H04W 92/20
See application file for complete search history.

(56) References Cited

U.S. PATENT DOCUMENTS

| | | | | |
|---|---|---|---|---|
| 10,206,232 B2* | 2/2019 | Novlan | ............. | H04W 74/0833 |
| 10,623,067 B2* | 4/2020 | Wang | .................... | H04B 7/0452 |
| 10,764,891 B2* | 9/2020 | Boyer | ................. | H04L 27/2636 |
| 2001/0007137 A1* | 7/2001 | Suumaki | ............... | H04L 1/0082 |
| | | | | 714/18 |
| 2003/0016698 A1* | 1/2003 | Chang | .................. | H04L 1/1812 |
| | | | | 370/469 |

(Continued)

FOREIGN PATENT DOCUMENTS

| | | |
|---|---|---|
| CN | 111490859 A | 8/2020 |
| EP | 2 214 435 A1 | 4/2010 |
| WO | 2019/216670 A1 | 11/2019 |

OTHER PUBLICATIONS

AT&T, "End-to-End vs hop-by-hop RLC ARQ design for L2 relaying in IAB", R2-1808041, 3GPP TSG-RAN WG2 #102, Busan, Korea, May 10, 2018 See sections 3.1, 3.2.1; and figure 3.

(Continued)

*Primary Examiner* — Raj Jain
(74) *Attorney, Agent, or Firm* — Jefferson IP Law, LLP

(57) ABSTRACT

A method and apparatus for a wireless communication system is provided. The apparatus includes a transceiver and at least one processor coupled with the transceiver and configured to receive data from a first node, transmit the data to a second node, receive, from the second node, radio link control (RLC) feedback information corresponding to the transmitted data and transmit, to the first node, RLC feedback information corresponding to the received data based on the received RLC feedback information and the received data.

12 Claims, 14 Drawing Sheets

(56) References Cited

U.S. PATENT DOCUMENTS

| | | | |
|---|---|---|---|
| 2003/0053440 A1* | 3/2003 | Gruhn | H04W 28/06 370/349 |
| 2005/0135284 A1* | 6/2005 | Nanda | H04L 29/06 370/294 |
| 2007/0079207 A1* | 4/2007 | Seidel | H04L 1/1845 714/748 |
| 2008/0148136 A1* | 6/2008 | Bae | H04L 1/1874 714/799 |
| 2010/0322197 A1* | 12/2010 | Adjakple | H04B 7/155 370/332 |
| 2014/0098797 A1* | 4/2014 | Kanamarlapudi | H04L 1/1867 370/336 |
| 2015/0215987 A1* | 7/2015 | Kim | H04L 1/08 370/329 |
| 2016/0212661 A1* | 7/2016 | Mallick | H04L 1/1614 |
| 2016/0262066 A1* | 9/2016 | Ozturk | H04W 36/08 |
| 2017/0006499 A1 | 1/2017 | Hampel et al. | |
| 2017/0012751 A1 | 1/2017 | Leroux et al. | |
| 2017/0099128 A1* | 4/2017 | Gao | H04L 1/1867 |
| 2018/0049214 A1* | 2/2018 | Kubota | H04W 36/08 |
| 2018/0063014 A1* | 3/2018 | Yu | H04W 28/0252 |
| 2018/0092139 A1* | 3/2018 | Novlan | H04W 56/001 |
| 2018/0132210 A1* | 5/2018 | Rico Alvarino | H04L 5/0003 |
| 2018/0139787 A1* | 5/2018 | Islam | H04W 48/16 |
| 2018/0152353 A1 | 5/2018 | Bergstrom et al. | |
| 2018/0270791 A1* | 9/2018 | Park | H04W 8/24 |
| 2018/0352524 A1* | 12/2018 | Abedini | H04L 5/005 |
| 2019/0182140 A1* | 6/2019 | Tenny | H04L 41/12 |
| 2019/0223002 A1* | 7/2019 | Novlan | H04W 24/02 |
| 2019/0230736 A1 | 7/2019 | Quan et al. | |
| 2019/0289492 A1* | 9/2019 | Hampel | H04W 76/12 |
| 2019/0349036 A1* | 11/2019 | Wang | H04B 7/14 |
| 2019/0372887 A1* | 12/2019 | Majmundar | H04W 40/22 |
| 2020/0036484 A1* | 1/2020 | Kim | H04L 1/1621 |
| 2020/0344666 A1* | 10/2020 | Wang | H04W 24/10 |
| 2020/0344843 A1* | 10/2020 | Zhu | H04W 76/11 |
| 2020/0413457 A1* | 12/2020 | Hong | H04W 76/10 |
| 2021/0092667 A1 | 3/2021 | Zhu et al. | |
| 2021/0105795 A1* | 4/2021 | Zhu | H04B 7/2606 |
| 2021/0159968 A1 | 5/2021 | Fujishiro et al. | |
| 2021/0235519 A1* | 7/2021 | Yi | H04W 76/12 |
| 2021/0243672 A1* | 8/2021 | Deshmukh | H04W 28/0268 |
| 2021/0258109 A1 | 8/2021 | Cho et al. | |

OTHER PUBLICATIONS

ZTE, "Consideration on RLC ARQ in IAB", R2-1807396, 3GPP TSG-RAN WG2 #102, Busan, Korea, May 11, 2018 See sections 2.1-2.2.

CATT, "ARQ for IAB", R2-1809820, 3GPP TSG RAN WG2 #NR ADHOC2, Montreal, Canada, Jun. 22, 2018 See section 2.

Samsung, "IAB failure recovery as part of route management", R3-183865, 3GPP TSG RAN WG3 AH 1807, Montreal, Canada, Jun. 26, 2018 See sections 1-2.

International Search Report dated Nov. 20, 2019, issued in International Patent Application No. PCT/KR2019/009362.

3rd Generation Partnership Project; Technical Specification Grouop Radio Access Network; Study on Integrated Access and Backhaul; (Release 15); XP051473122; Jun. 2016.

Samsung: "Initial access procedure in IAB" 3GPP; R3-183864, Montreal Canada Jul. 2-6, 2018.

AT&T: End-to-end vs. hop-by-hop RLC ARQ design for L2 relaying in IAB; R2-1808758, Busan Korea, May 21-25, 2018.

Shi Cong et al.: "Retransmission Schemes for 5G Radio Interface"; XP033063214; 978-I-5090-2482-7; 2016 IEEE.

European Search Report dated Aug. 2, 2021, issued in European Application No. 19842260.2.

European Search Report dated Aug. 11, 2021, issued in European Application No. 19846521.3.

European Search Report dated Sep. 17, 2021, issued in European Application No. 19846521.3.

ZTE, Consideration on RLC ARQ in IAB, Further comparison between hop-by-hop ARQ and E2E ARQ, 3GPP TSG-RAN WG2 Meeting #102, R2-1807396, Busan, Korea, May 21-25, 2018.

Huawei, HiSilicon, Discussion on User Plane for IAB, Further comparison between hop-by-hop ARQ and E2E ARQ, 3GPP TSG-RAN WG2 Ad Hoc, R2-1810678, Montreal, Canada, Jul. 2-6, 2018.

Great Britain search report dated Feb. 4, 2019, in Great Britain Application No. 1812981.7.

International Search Report dated Nov. 19, 2019, in International Application No. PCT/KR2019/009982.

U.S. Office Action dated Feb. 15, 2022, issued in U.S. Appl. No. 17/250,593.

\* cited by examiner

Enhanced End-to-end ARQ 1

Enhanced End-to-end ARQ 2

METHOD AND APPARATUS FOR WIRELESS COMMUNICATION OF WIRELESS NODE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2018-0088159, filed on Jul. 27, 2018, in the Korean Intellectual Property Office, and a Korean patent application number 10-2018-0097558, filed on Aug. 21, 2018, in the Korean Intellectual Property Office, the disclosure of each of which is incorporated by reference herein in its entirety.

BACKGROUND

1. Field

The disclosure relates to a wireless communication system, and a method and apparatus for smoothly providing a service in a wireless communication system. More particularly, the disclosure relates to a method and apparatus in which a wireless node of a wireless communication system transmits/receives data.

2. Description of Related Art

In order to meet the increasing demand with respect to wireless data traffic because of the commercialization of $4^{th}$ generation (4G) communication systems, efforts have been made to develop improved $5^{th}$ generation (5G) communication systems or pre-5G communication systems. For this reason, 5G communication systems or pre-5G communication systems are called Beyond 4G network communication systems or Post Long-Term Evolution (LTE) systems. 5G communication systems defined in the $3^{rd}$ generation partnership project (3GPP) are referred to as new radio (NR) systems. In order to achieve a high data transfer rate, consideration is given to implementing 5G communication systems in millimeter wave (mmW) frequency bands (e.g., 60 GHz bands). In order to reduce propagation path loss and increase a propagation distance in millimeter wave frequency bands, in 5G communication systems, discussions are underway about technologies such as beamforming, massive multiple-input and multiple-output (MIMO), full dimensional MIMO (FD-MIMO), array antenna, analog beamforming, and large scale antenna, which are applied to NR systems. Also, in order to improve networks of systems, in 5G communication systems, developments of technologies such as evolved small cell, advanced small cell, cloud radio access network (RAN) (cloud RAN), ultra-dense network, device to device communication (D2D), wireless backhaul, moving network, cooperative communication, coordinated multi-points (CoMP), and interference cancellation are underway. Furthermore, in 5G communication systems, developments of an advanced coding modulation (ACM) scheme such as hybrid frequency-shift keying (FSK) and quadrature amplitude modulation (QAM) (FQAM) or sliding window superposition coding (SWSC) and an enhanced network access scheme such as filter bank multi-carrier (FBMC), non-orthogonal multiple access (NOMA), or sparse code multiple access (SCMA) are underway.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus, technology for inter-object connection, such as a sensor network, machine to machine (M2M) communication, or machine type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Various attempts are made to apply 5G communication systems to IoT networks. For example, 5G communication such as a sensor network, M2M communication, or MTC is implemented by technology such as beamforming, MIMO, or array antenna. The application of a cloud RAN as big data processing technology may also be considered as an example of convergence of 5G technology and IoT technology.

Because mobile communication systems may provide various services due to the development of the mobile communication systems, there are demands for methods of effectively providing the services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method of effectively providing a service in a mobile communication system.

In accordance with an aspect of the disclosure, an apparatus is provided. The apparatus includes a transceiver and at least one processor coupled with the transceiver and configured to receive data from a first node, transmit the data received from the first node to a second node, receive, from the second node, radio link control (RLC) feedback information corresponding to the transmitted data and transmit, to the first node, RLC feedback information corresponding to the data received from the first node based on the received RLC feedback information and the data received from the first node.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
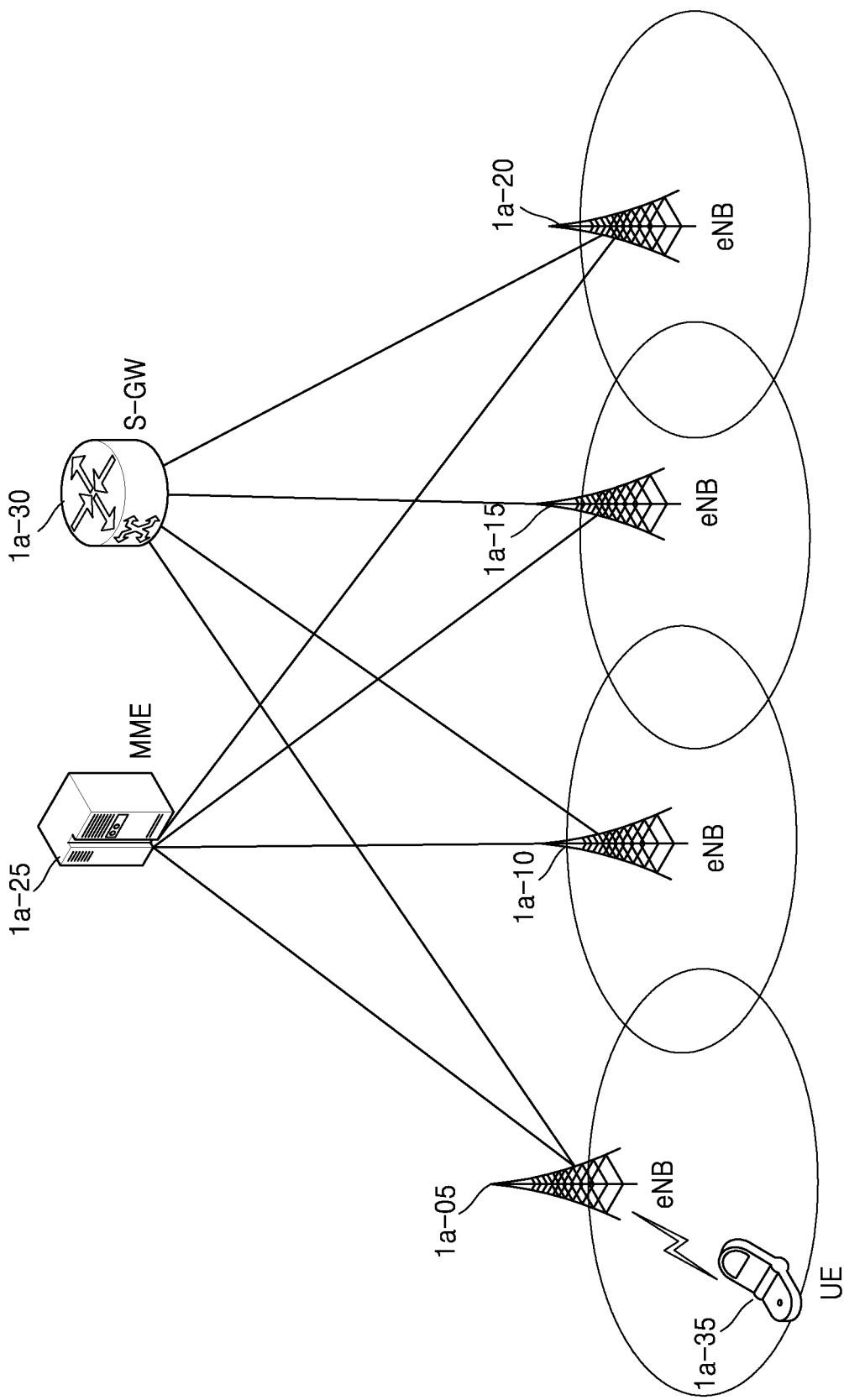
FIG. 1 is a diagram illustrating a structure of a Long-Term Evolution (LTE) an LTE system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and methods of achieving them will become apparent with reference to various embodiments of the disclosure described in detail below with reference to the accompanying drawings. The disclosure may, however, be embodied in many different forms and should not be construed as limited to various embodiments set forth herein; rather these embodiments are provided so that this disclosure will be thorough and complete, and will fully convey the scope of the disclosure only defined by the claims to one of ordinary skill in the art. In the specification, the same elements are denoted by the same reference numerals.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory produce an article of manufacture including instruction means that perform the functions specified in the flowchart block or blocks. The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in the disclosure, refers to a software or hardware component, such as field-programmable gate array (FPGA) or application-specific integrated circuit (ASIC), which performs certain tasks. However, the term "~unit" is not meant to be limited to software or hardware. A unit may be configured to be in an addressable storage medium or configured to operate one or more processors. Thus, a unit may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and units may be combined into fewer components and units or further separated into additional components and units. Further, the components and units may be implemented to operate one or more central processing units (CPUs) in a device or a secure multimedia card. Also, a unit may include one or more processors in an embodiment of the disclosure.

Throughout the disclosure, the expression "at least one of a, b or c" indicates only a, only b, only c, both a and b, both a and c, both b and c, all of a, b, and c, or variations thereof.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

Hereinafter, for convenience of explanation, the disclosure uses terms and names defined in the $3^{rd}$ generation partnership project (3GPP) Long-Term Evolution (LTE) (3GPP LTE) standards. However, the disclosure is not limited to the terms and names, and may also be applied to systems following other standards, and throughout the specification, a layer may also be referred to as an entity. In the disclosure, an evolved node B (eNB) may be interchangeably used with a next-generation node B (gNB) for convenience of explanation. That is, a base station (BS) described by an eNB may represent a gNB. In the disclosure, the term "terminals" may refer to not only mobile phones, narrowband Internet of Things (NB-IoT) devices, and sensors but also other wireless communication devices.

A wireless backhaul network according to an embodiment of the disclosure may provide an automatic repeat request (ARQ) function that avoids data loss between end-to-end nodes (e.g., a terminal and an integrated access backhaul (IAB) donor) that transmit/receive data, at each wireless node. In an embodiment of the disclosure, each wireless node may be an IAB node, an IAB donor, or a terminal. In an embodiment of the disclosure, the term "IAB donor" may refer to a wireless end node that delivers received data to a core network.

The ARQ function according to an embodiment of the disclosure may be performed by two end nodes, for example, the terminal and the IAB donor or the IAB node and the IAB donor, which transmit/receive data. In an embodiment of the disclosure, the data transmitted/received between the two end nodes may be received or delivered through a plurality of wireless nodes (e.g., IAB nodes).

In the ARQ function according to an embodiment of the disclosure, a transmitting end (e.g., a transmitting radio link control (RLC) layer device) may drive a transmission window, and a receiving end (e.g., a receiving RLC layer) may drive a reception window and may drive a timer. In an embodiment of the disclosure, the receiving RLC layer device may allow data transmission for data corresponding to RLC sequence numbers in the transmission window. Also, the receiving RLC layer device may check an RLC status report (e.g., an RLC status protocol data unit (PDU)) received from the receiving end and may move a lower edge of the transmission window up to RLC sequence numbers whose sequential successful delivery is confirmed.

In an embodiment of the disclosure, the receiving end (e.g., the receiving RLC layer device) may deliver, to an upper layer regardless of an order, only completely received data (e.g., a complete RLC service data unit (SDU)), not divided data (e.g., an RLC SDU segment), among data corresponding to successfully received RLC sequence numbers. Also, the receiving end may move a lower edge of a reception RLC window in accordance with sequential RLC sequence numbers, based on successfully received RLC sequence numbers corresponding to completely received data (e.g., a complete RLC SDU) among RLC sequence numbers.

Also, when RLC sequence numbers are not sequential and there is an RLC sequence number that does not arrive yet, that is, when an RLC sequence number gap occurs, the receiving end (e.g., the receiving RLC layer device) according to an embodiment of the disclosure may drive the timer. When data corresponding to the RLC sequence number that does not arrive is not completely received until the timer expires, the receiving end may trigger and configure an RLC status report and may transmit a negative acknowledgement (NACK) indicating that the RLC sequence number is not successfully delivered to the transmitting end. Also, the RLC status may be triggered when polling is indicated in an RLC header of received data.

Also, the transmitting end (e.g., the transmitting RLC layer device) according to an embodiment of the disclosure may receive and interpret the RLC status report and may retransmit data whose successful delivery is not confirmed (NACK) in the order of RLC sequence numbers.

A network supporting wireless backhaul according to an embodiment of the disclosure may drive an ARQ function at each of two end nodes when the two end nodes (e.g., a terminal and an IAB donor or an IAB node and an IAB donor) transmit/receive data and may provide a multi-hop ARQ method in which each wireless node (e.g., an IAB node, an IAB donor, or a terminal) that delivers data between the two end nodes efficiently improves the ARQ function. In the multi-hop ARQ method according to the disclosure, intermediate wireless nodes may receive, read, and interpret an RLC status report, and may perform rapid retransmission or may reconfigure and deliver the RLC status report.

In more detail, in an embodiment of the disclosure, wireless nodes (e.g., IAB nodes) that receive and deliver data between two end nodes may be driven by performing all or some of the following functions according to the disclosure.

1. Each intermediate wireless node may read and interpret an RLC status report received from a parent wireless node or a child wireless node, and may reconfigure the RLC status report.

2. When received data is to be discarded, each wireless node may read an RLC status report (e.g., an RLC status PDU) received from a parent wireless node (e.g., a parent IAB node) or a child wireless node (e.g., a child IAB node), and may discard only data whose successful delivery is confirmed (RLC positive acknowledgement (ACK)) in the RLC status report.

3. Each wireless node may have a function of storing data received from a parent wireless node (e.g., a parent IAB node) or a child node (e.g., a child IAB node) even after delivering the data to the child wireless node (e.g., the child IAB node) or the parent wireless node (e.g., the parent IAB node), and when necessary, performing retransmission.

4. When each wireless node reads and interprets an RLC status report received from a parent wireless node (e.g., a parent IAB node) or a child wireless node (e.g., a child IAB node) and there is stored data whose successful delivery is not confirmed (NACK) in the RLC status report, the wireless node may have a function of performing retransmission.

5. When each wireless node reads and interprets an RLC status report received from a parent wireless node (e.g., a parent IAB node) or a child wireless node (e.g., a child IAB node), there is stored data whose successful delivery is not confirmed (NACK) in the RLC status report, and the wireless node performs retransmission, the wireless node may have a function of reconfiguring or newly generating the RLC status report and delivering the RLC status report to the child wireless node.

6. When each wireless node reads and interprets an RLC status report received from a parent wireless node (e.g., a parent IAB node) or a child wireless node (e.g., a child IAB node), there is stored data whose successful delivery is not confirmed (NACK) in the RLC status report, and the wireless node performs retransmission, the wireless node may have a function of indicating that data retransmitted when the RLC status report is reconfigured or newly generated is successfully delivered (ACK), instead of not being successfully delivered (NACK), and delivering the data to a next wireless node.

Because each wireless node may perform rapid retransmission by performing the above functions according to an embodiment of the disclosure, transmission delay due to retransmission may be reduced and lossless data transmission may be supported.

In an embodiment of the disclosure, the term "child wireless node (e.g., child IAB node)" may refer to a terminal or an IAB node. A child wireless node may receive wireless access configuration, radio resource control (RRC) configuration information, bearer configuration information, and configuration information of each packet data convergence control (PDCP), RLC, medium access control (MAC), or physical (PHY) layer device from a parent wireless node (e.g., a parent IAB node or IAB donor), and may indicate a wireless node using the information.

In an embodiment of the disclosure, the term "parent wireless node" may refer to an IAB node or an IAB donor. A parent wireless node may denote a wireless node that sets wireless access configuration, RRC configuration information, bearer configuration information, and configuration information of each PDCP, RLC, MAC, or PHY layer device to a child wireless node.

Various embodiments of the disclosure will now be described more fully with reference to the accompanying drawings.

FIG. 1 is a diagram illustrating a structure of an LTE system according to an embodiment of the disclosure.

Referring to FIG. 1, a wireless access network of the LTE system may include next-generation eNBs (e.g., node Bs or BSs) 1a-05, 1a-10, 1a-15, and 1a-20, a mobility management entity (MME) 1a-25, and a serving gateway (S-GW) 1a-30. User equipment (UE) (e.g., a terminal) 1a-35 may access an external network through the eNBs 1a-05 through 1a-20 and the S-GW 1a-30.

Referring to FIG. 1, the eNBs 1a-05 through 1a-20 may correspond to node Bs of a universal mobile telecommunication system (UMTS) system. Each eNB is connected to the UE 1a-35 through a wireless channel and performs a more complex function than a node B. In the LTE system, because all user traffic including a real-time service such as a voice over Internet protocol (IP) (VoIP) through an Internet protocol is provided through a shared channel, a device for collecting and scheduling state information such as buffer states of UEs, available transmission power states, or channel states may be required and, the eNBs 1a-05 through 1a-20 may perform the function of the device. One eNB may generally control a plurality of cells. For example, in order to achieve a transmission speed of 100 Mbps, the LTE system may use orthogonal frequency division multiplexing (OFDM) as wireless access technology in a bandwidth of, for example, 20 MHz. Also, an adaptive modulation and coding (AMC) scheme that determines a modulation scheme and a channel coding rate in accordance of a channel state of a terminal may be applied. The S-GW 1a-30 may be a device for providing a data bearer, and may generate or remove the data bearer under the control of the MME 1a-25. The MME 1a-25 that performs various control functions as well as a mobility management function for a terminal may be connected to a plurality of BSs.

Figure 2:
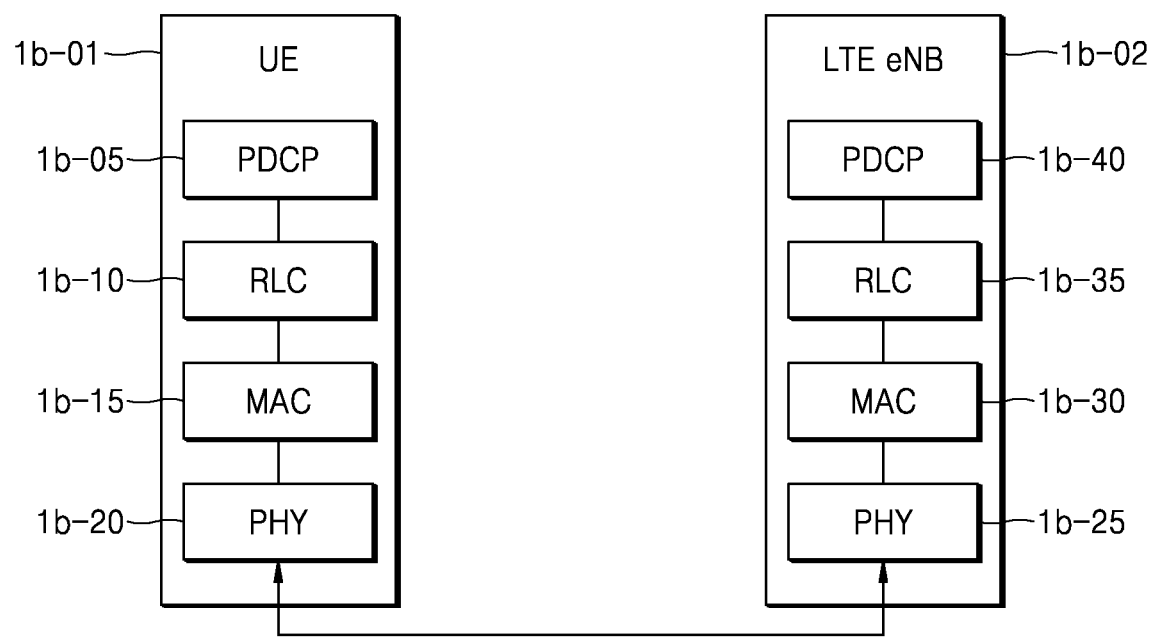
FIG. 2 is a diagram illustrating a wireless protocol structure of an LTE system according to an embodiment of the disclosure.

FIG. 2 is a diagram illustrating a wireless protocol structure in an LTE system according to an embodiment of the disclosure.

Referring to FIG. 2, in the wireless protocol structure of the LTE system, a terminal 1b-01 and an eNB 1b-02 may include packet data convergence protocols (PDCPs) 1b-05 and 1b-40, radio link controls (RLCs) 1b-10 and 1b-35, and medium access controls (MACs) 1b-15 and 1b-30. The PDCPs 1b-05 and 1b-40 are in charge of an IP header compression/decompression operation. A main function of each PDCP may be summarized as follows.

Header compression and decompression (robust header compression (ROHC) only)

Transfer of user data

In-sequence delivery of upper layer PDUs at PDCP re-establishment procedure for RLC acknowledged mode (AM)

For split bearers in dual connectivity (DC) (only support for RLC AM): PDCP PDU routing for transmission and PDCP PDU reordering for reception Duplicate detection of lower layer SDUs at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The RLCs 1b-10 and 1b-35 may reconfigure a PDCP PDU to have an appropriate size and may perform an ARQ operation or the like. A main function of each RLC may be summarized as follows.

Transfer of upper layer PDUs

Error correction through ARQ (only for AM data transfer)

Concatenation, segmentation, and reassembly of RLC SDUs (only for unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MACs 1b-15 and 1b-30 may be connected to a plurality of RLC layer devices included in one terminal, and may perform an operation of multiplexing RLC PDUs to a MAC PDU and demultiplexing the RLC PDUs from the MAC PDU. A main function of each MAC may be summarized as follows.

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through hybrid automatic repeat request (HARQ)

Priority handling between logical channels of one UE

Priority handling between UEs by means of dynamic scheduling multimedia broadcast multicast service (MBMS) identification Transport format selection Padding PHY layers 1b-20 and 1b-25 may perform an operation of channel-coding and modulating upper layer data to generate an OFDM symbol and transmitting the OFDM symbol to a wireless channel, or demodulating and channel-decoding the OFDM symbol received through the wireless channel and delivering the demodulated and channel-decoded OFDM symbol to an upper layer.

Figure 3:
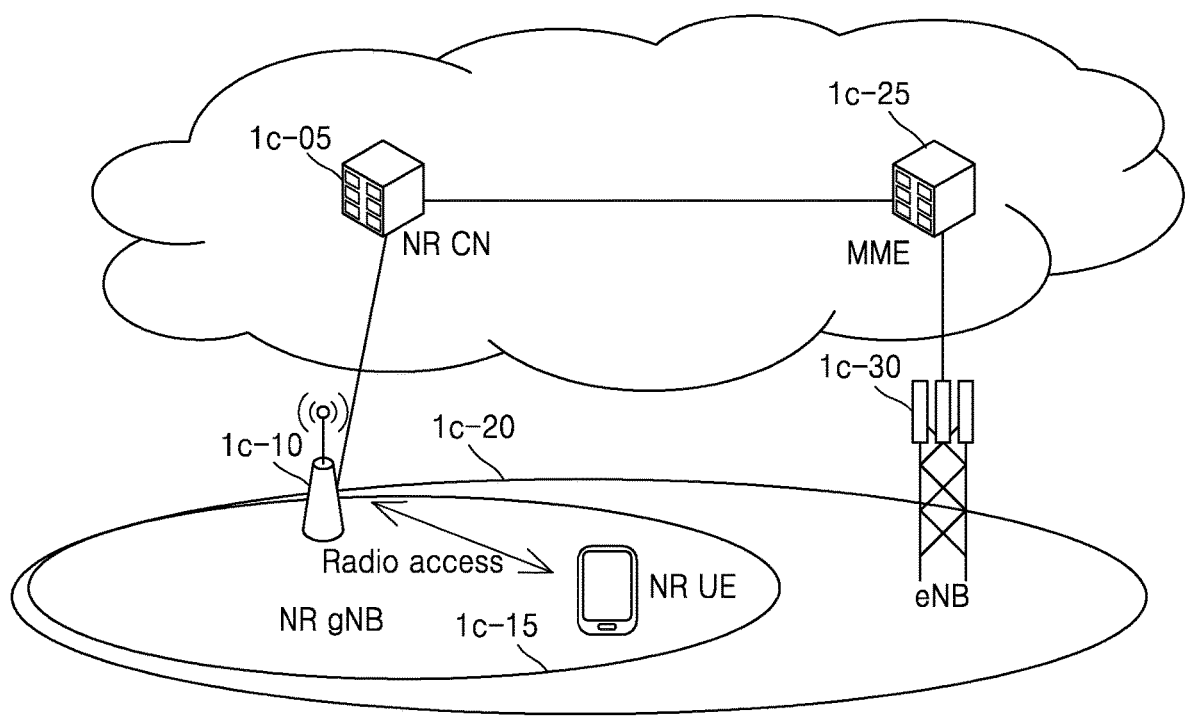
FIG. 3 is a diagram illustrating a structure of a next-generation mobile communication system according to an embodiment of the disclosure.

FIG. 3 is a diagram illustrating a structure of a next-generation mobile communication system according to an embodiment of the disclosure.

Referring to FIG. 3, a wireless access network of the next-generation mobile communication system (e.g., a new radio (NR) system or a 5$^{th}$ generation (5G) system) may include an NR node B (NR gNB) (or an NR BS) 1c-10 and an NR core network (CN) (NR CN) 1c-05. NR UE (or a terminal) 1c-15 may access an external network through the NR gNB 1c-10 and the NR CN 1c-05.

Referring to FIG. 3, the NR gNB 1c-10 may correspond to an eNB of an existing LTE system. The NR gNB 1c-10 may be connected to the NR UE 1c-15 through a wireless channel, and may provide a better service than a node B. Because all user traffic is provided through a shared channel in the next-generation mobile communication system, a device for collecting and scheduling state information such as buffer states of UEs, available transmission power states, or channel states is required and the NR gNB 1c-10 performs the function of the device. One NR gNB 1c-10 generally controls a plurality of cells. In order to achieve ultra high speed data transmission when compared to current LTE, the NR gNB 1c-10 may have a bandwidth equal to or greater than an existing maximum bandwidth, and beamforming technology may be additionally combined by using OFDM as wireless access technology. Also, an AMC scheme that determines a modulation scheme and a channel coding rate in accordance of a channel state of a terminal may be applied. The NR CN 1c-05 may perform functions such as mobility support, bearer configuration, and quality of service (QoS) configuration. The NR CN 1c-05 that performs various control functions as well as a mobility management function for a terminal may be connected to a plurality of BSs. Also, the next-generation mobile communication system may interoperate with an existing LTE system, and the NR CN 1c-05 may be connected to an MME 1c-25 through a network interface. The MME 1c-25 may be connected to an eNB 1c-30 that is an existing BS.

Figure 4:
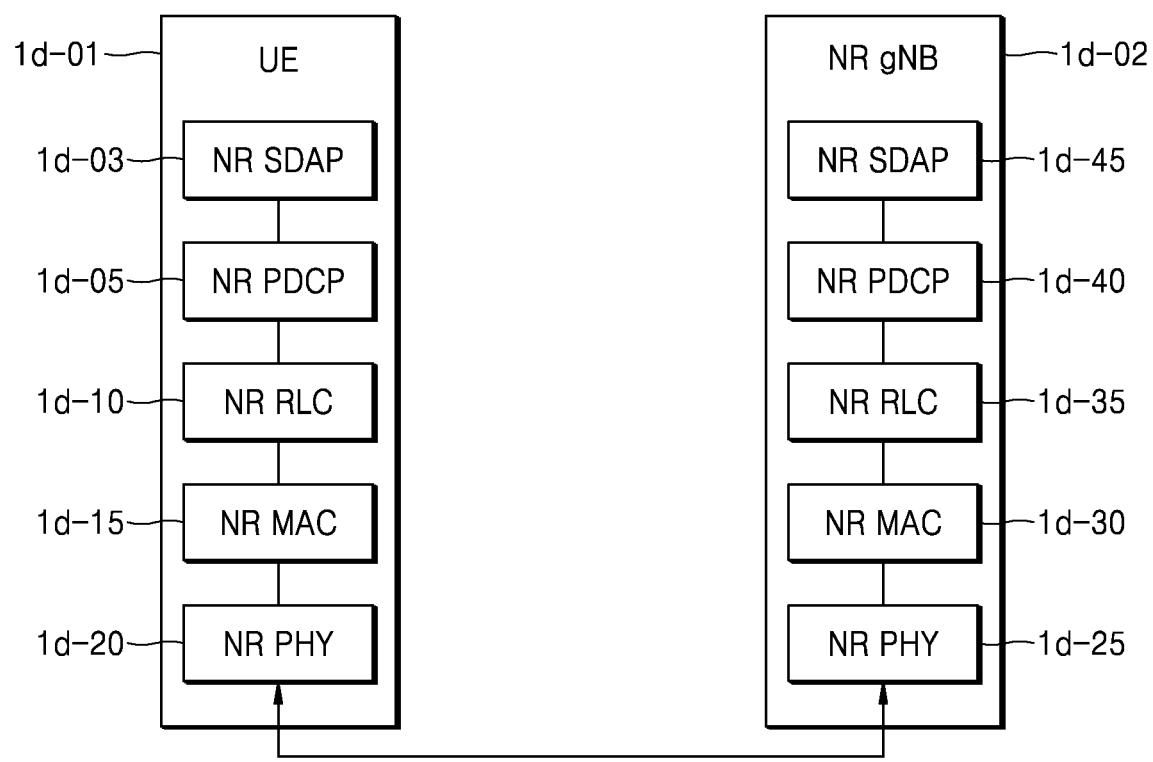
FIG. 4 is a diagram illustrating a wireless protocol structure of a next-generation mobile communication system according to an embodiment of the disclosure.

FIG. 4 is a diagram illustrating a wireless protocol structure of a next-generation mobile communication system according to an embodiment of the disclosure.

Referring to FIG. 4, in the wireless protocol structure of the next-generation mobile communication system, a terminal 1d-01 and an NR BS/gNB 1d-02 may include NR service data adaptation protocols (SDAPs) 1d-03 and 1d-45, NR PDCPs 1d-05 and 1d-40, NR RLCs 1d-10 and 1d-35, and NR MACs 1d-15 and 1d-30. A main function of the NR SDAPs 1d-03 and 1d-45 may have some of the following functions.

Transfer of user plane data

Mapping between QoS flow and a data radio bearer (DRB) for both DL and UL

Marking QoS flow identification (ID) in both DL and UL packets

Reflective QoS flow to DRB mapping for the UL SDAP PDUs

Regarding an SDAP layer device, whether to use a header of the SDAP layer device or whether to use a function of the SDAP layer device for each PDCP layer device, each bearer, or each logical channel may be set to the terminal 1d-01, and when an SDAP header is set, a 1-bit non-access stratum (NAS) reflective QoS indicator and a 1-bit access stratum (AS) reflective QoS indicator of the SDAP header may be used to indicate that the terminal 1d-01 may update or reconfigure mapping information for a data bearer and QoS flow of uplink and downlink. The SDAP header may include QoS flow ID information indicating QoS. The QoS information may be used as a data processing priority information or scheduling information for supporting a smooth service.

A main function of the NR PDCPs 1d-05 and 1d-40 may be some of the following ones.

Header compression and decompression (ROHC only)

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

In an embodiment of the disclosure, a reordering function of an NR PDCP device may have a function of sequentially reordering PDCP PDUs received from a lower layer based on PDCP sequence numbers (SNs) and a function of sequentially delivering data to an upper layer in a reordered order. Alternatively, the reordering function of the NR PDCP device may include at least one of a function of directly delivering data without considering an order, a function of performing reordering and recording missing PDCP PDUs, a function of transmitting a status report of the missing PDCP PDUs to a transmitting side, or a function of requesting retransmission of the missing PDCP PDUs.

A main function of the NR RLCs 1d-10 and 1d-35 may be some of the following ones.
  Transfer of upper layer PDUs
  In-sequence delivery of upper layer PDUs
  Out-of-sequence delivery of upper layer PDUs
  Error correction through ARQ
  Concatenation, segmentation, and reassembly of RLC SDUs
  Re-segmentation of RLC data PDUs
  Reordering of RLC data PDUs
  Duplicate detection
  Protocol error detection
  RLC SDU discard
  RLC re-establishment In an embodiment of the disclosure, an in-sequence delivery function of an NR RLC device refers to a function of sequentially delivering RLC SDUs received from a lower layer to an upper layer. When one RLC SDU is divided into a plurality of RLC SDUs and received, the in-sequence delivery function of the NR RLC device may have at least one of a function of reassembling and delivering the RLC SDUs, a function of reordering received RLC PDUs based on RLC SNs or PDCP SNs, a function of performing reordering and recording missing RLC PDUs, a function of transmitting a status report of the missing RLC PDUs to a transmitting side, a function of requesting retransmission of the missing RLC PDUs, a function of, when there is a missing RLC SDU, sequentially delivering only RLC SDUs before the missing RLC SDU to an upper layer, a function of, when there is a missing RLC SDU and a timer expires, sequentially delivering all RLC SDUs received before the timer starts to the upper layer, or a function of, when there is a missing RLC SDU and the timer expires, sequentially delivering all RLC SDUs received up to present to the upper layer.

Also, an out-of-sequence delivery function of the NR RLC device may include processing RLC PDUs in an order of reception (in an order of arrival, regardless of an order of SNs) and delivering the RLC PDUs to a PDCP device regardless of the order (out-of-sequence delivery), and even for segments, receiving segments stored in a buffer or to be received, reconfiguring the segments into one complete RLC PDU, processing the complete RLC PDU, and delivering the complete RLC PDU to the PDCP device. The NR RLC device may not have a concatenation function, and the function may be performed by an NR MAC device or may be replaced with a multiplexing function of an NR MAC device.

In an embodiment of the disclosure, an out-of-sequence delivery function of the NR RLC device may include a function of directly delivering RLC SDUs received from a lower layer to an upper layer regardless of an order, and when one RLC SDU is divided into a plurality of RLC SDUs and received, the out-of-sequence delivery function of the RLC device may include at least one of a function of reassembling and delivering the RLC SDUs, or a function of storing RLC SNs or PDCP SNs of received RLC PDUs, performing reordering, and recording missing RLC PDUs.

The NR MACs 1d-15 and 1d-30 may be connected to a plurality of NR RLC layer devices included in one terminal, and a main function of each NR MAC may be some of the following ones.
  Mapping between logical channels and transport channels
  Multiplexing/demultiplexing of MAC SDUs
  Scheduling information reporting
  Error correction through HARQ
  Priority handling between logical channels of one UE
  Priority handling between UEs by means of dynamic scheduling
  MBMS identification
  Transport format selection
  Padding NR PHY layers 1d-20 and 1d-25 may perform an operation of channel-coding and modulating upper layer data to generate an OFDM symbol and transmitting the OFDM symbol to a wireless channel, or demodulating and channel-decoding the OFDM symbol received through the wireless channel and delivering the demodulated and channel-decoded OFDM symbol to an upper layer.

Figure 5:
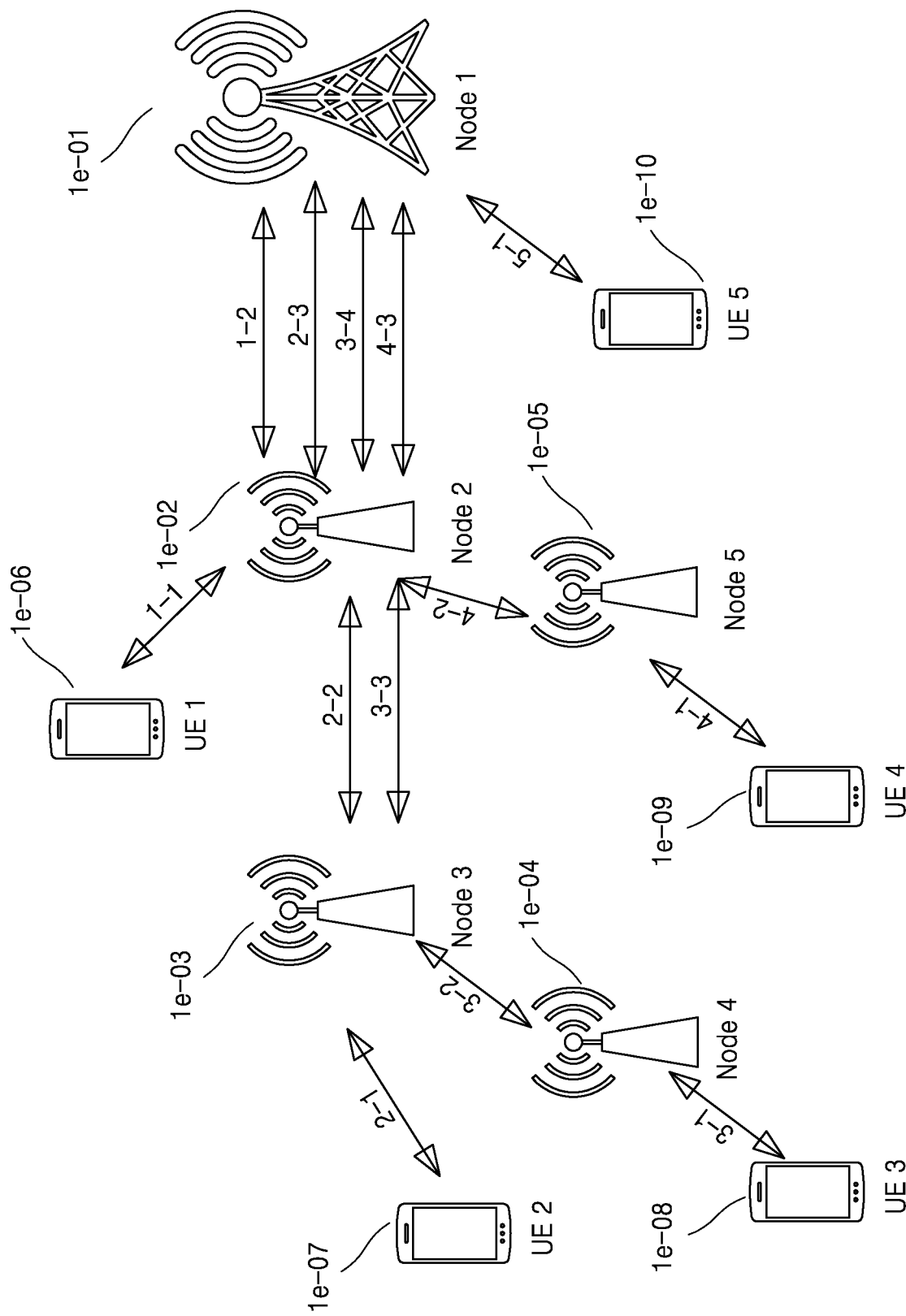
FIG. 5 is a diagram illustrating a network structure of a next-generation mobile communication system according to an embodiment of the disclosure.

FIG. 5 is a diagram illustrating a network structure of a next-generation mobile communication system according to an embodiment of the disclosure.

More particularly, FIG. 5 is a diagram illustrating a network structure supporting wireless backhaul, in a next-generation mobile communication system according to an embodiment of the disclosure.

Referring to FIG. 5, a wireless backhaul network (e.g., an IAB network) may include a plurality of wireless nodes (e.g., IAB nodes or IAB donors). In the wireless backhaul network, a terminal may access a wireless node, may establish RRC connection, and may transmit/receive data. Also, each wireless node may consider a wireless node different from a child IAB node as a parent IAB node, may establish RRC connection with the parent wireless node, and may transmit/receive data.

In an embodiment of the disclosure, the term "child wireless node (e.g., child IAB node)" may refer to a terminal or an IAB node, and may refer to a wireless node that receives wireless access configuration, RRC configuration information, bearer configuration information, and configuration information of each PDCP, RLC, MAC, or PHY layer device from a parent wireless node (e.g., a parent IAB node or IAB donor) and applies the information.

In an embodiment of the disclosure, the term "parent wireless node" may refer to an IAB node or an IAB donor. The term "parent wireless node" may refer to a wireless node that sets wireless access configuration, RRC configuration information, bearer configuration information, and configuration information of each PDCP, RLC, MAC, or PHY layer device to a child wireless node.

Referring to FIG. 5, the term "IAB donor" may refer to a wireless node, such as a wireless node 1 1e-01, which is connected to a core network and delivers data to an upper layer device. Also, the term "IAB node" may refer to a wireless node, such as any of wireless nodes 2 through 5 1e-02 through 1e-05, which delivers data in the middle in order to help to transmit/receive data between a terminal and an IAB donor.

Terminals 1 through 4 1e-06, 1e-07, 1e-08, and 1e-09 may access wireless nodes (e.g., IAB nodes or IAB donors), may establish RRC connection, and may transmit/receive data. For example, the terminal 2 1e-07 may access the wireless node 3 1e-03, may establish RRC connection, and may transmit/receive data. The wireless node 3 1e-03 may receive or deliver data, received from or to be transmitted to the terminal 2 1e-07, from or to the wireless node 2 1e-02 that is a parent wireless node.

Also, the wireless node 2 1e-02 may receive or deliver data, received from or to be transmitted to the wireless node 3 1e-03, from or to the wireless node 1 (IAB donor) 1e-01 that is a parent wireless node.

In an embodiment of the disclosure, the terminal 1 1e-06 may access the wireless node 2 1e-02, may establish RRC connection, and may transmit/receive data. The wireless node 2 1e-02 may receive or deliver data, received from or to be transmitted to the terminal 1 1e-06, from or to the wireless node 1 1e-01 that is a parent wireless node.

As described with reference to FIG. 5, a terminal may access a wireless node having a best signal intensity, may establish RRC connection, and may transmit/receive data. Also, in order for a terminal to deliver data to a wireless node connected to a core network and receive data from the wireless node connected to the core network, the wireless backhaul network according to the embodiment may support multi-hop data delivery through intermediate wireless nodes.

Figure 6:
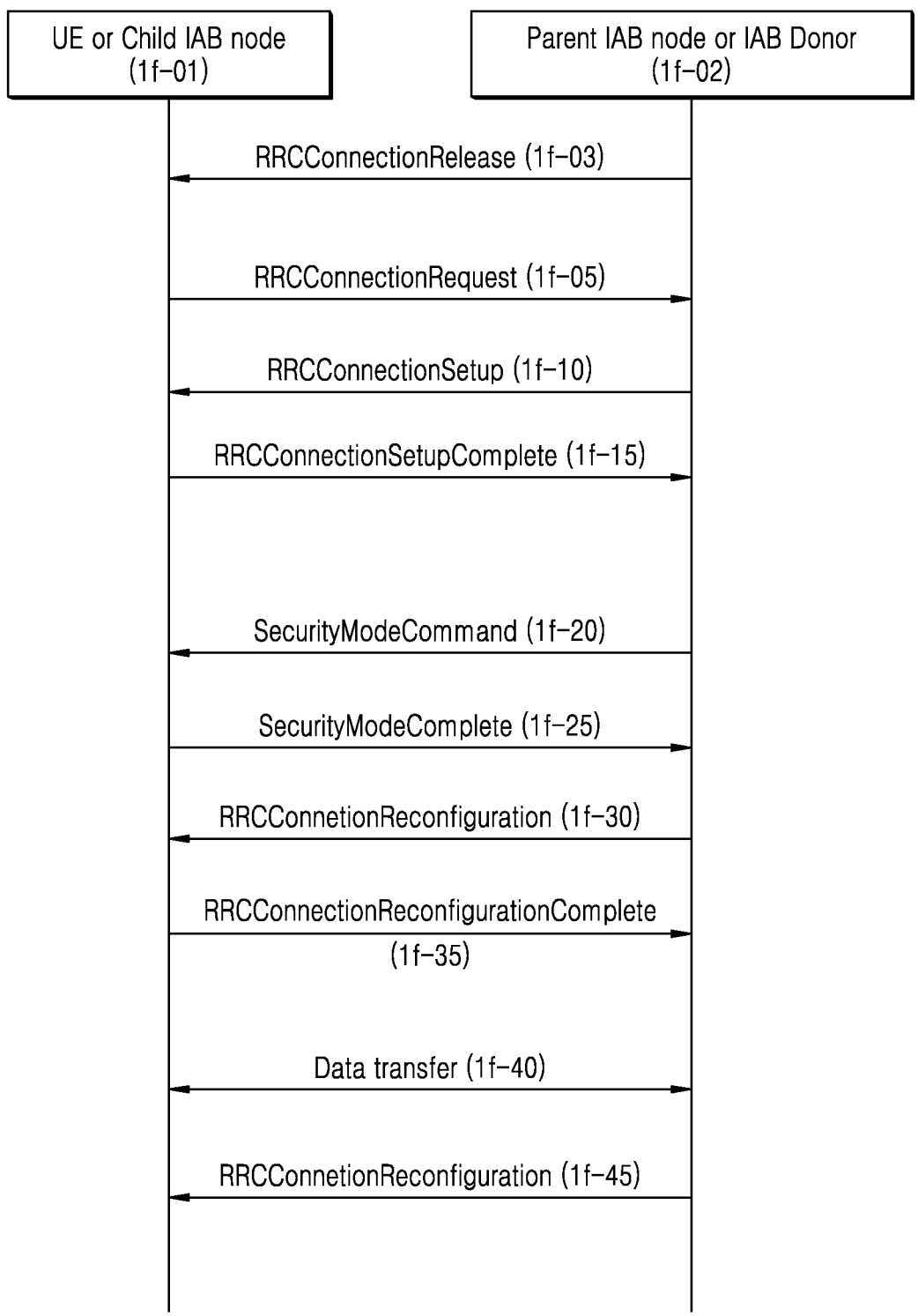
FIG. 6 is a diagram for describing a method in which a terminal performs radio resource control (RRC) connection establishment in a wireless backhaul network (e.g., an integrated access backhaul (IAB) network) of a next-generation mobile communication system according to an embodiment of the disclosure.

FIG. 6 is a diagram for describing a method in which a terminal performs RRC connection establishment in a wireless backhaul network (e.g., an IAB network) of a next-generation mobile communication system according to an embodiment of the disclosure.

More particularly, FIG. 6 is a diagram for describing a method of performing RRC connection establishment when a terminal sets connection with a wireless node (e.g., an IAB node or an IAB donor) or a child wireless node sets connection with a parent wireless node (e.g., an IAB node or an IAB donor) in a wireless backhaul network (e.g., an IAB network) of a next-generation mobile communication system according to an embodiment of the disclosure.

Referring to FIG. 6, in operation 1f-01, when a terminal or a child wireless node 1f-01 that transmits/receives data in an RRC connection mode does not transmit/receive data for a certain reason or during a certain period of time, a parent wireless node 1f-01 may transmit an RRCConnectionRelease message 1f-03 to the terminal or the child wireless node 1f-01 so that the terminal or the child wireless node 1f-01 switches to an RRC idle mode or an RRC inactive mode.

In an embodiment of the disclosure, when data to be transmitted is generated, the terminal or the child wireless node 1f-01 (referred to as idle mode UE) whose connection is not currently established may perform an RRC connection establishment process with the parent wireless node 1f-02 in the RRC idle mode and may perform an RRC connection resume procedure with the parent wireless node 1f-01 in the RRC inactive mode.

In operation 1f-05, the terminal or the child wireless node 1f-01 may establish unlink transmission synchronization with the parent wireless node 1f-02 through a random-access process, and may transmit an RRC connection request message (or an RRC resume request message) to the parent wireless node 1f-02. A reason (establishmentCause) for establishing connection with an identifier of the terminal or the child wireless node 1f-01 may be included in the RRC connection request message (or the RRC resume request message).

In operation 1f-10, the parent wireless node 1f-02 may transmit an RRCConnectionSetup message (or an RRCResume message) so that the terminal or the child wireless node 1f-01 establishes RRC connection. At least one of configuration information for each logical channel, configuration information for each bearer, configuration information of a PDCP layer device, configuration information of an RLC layer device, or configuration information of a MAC layer device may be included in the RRCConnectionSetup message (or the RRCResume message).

In an embodiment of the disclosure, when the terminal or the child wireless node 1f-01 performs handover, the parent wireless node 1f-02 may set an indicator indicating whether to retransmit pre-configured RRC messages to a target parent wireless node or cell, by using the RRCConnectionSetup message (or the RRCResume message). For example, the parent wireless node 1f-02 may instruct to retransmit RRC messages transmitted within several seconds before a handover indication message is received, before handover is performed, or before RRC messages are received. In an embodiment of the disclosure, the parent wireless node 1f-02 may set an indicator to each of the pre-configured RRC messages. That is, multiple indicators may respectively indicate whether to retransmit RRC messages. Alternatively, in an embodiment of the disclosure, the parent wireless node 1f-02 may indicate whether to perform retransmission by using a bitmap indicating each RRC message.

An indicator instructing to perform a PDCP data recovery procedure may be included in PDCP configuration information of the RRCConnectionSetup message (or the RRCResume message). Also, an indicator indicating whether to perform the PDCP data recovery procedure on a signaling radio bearer (SRB) or a DRB may be included in bearer configuration information of the RRCConnectionSetup message. Also, an indicator indicating whether to discard data remaining in the PDCP layer device for the SRB or the DRB may be included in the bearer configuration information of the RRCConnectionSetup message.

In an embodiment of the disclosure, an indicator indicating whether to perform cumulative retransmission or selective retransmission on an AM DRB when a PDCP reestablishment procedure is performed may be included in the bearer configuration information of the RRCConnectionSetup message (or the RRCResume message).

In an embodiment of the disclosure, the RRCConnectionSetup message (or the RRCResume message) may include an indicator indicating which ARQ function is to be used in the child wireless node 1f-01. The parent wireless node 1f-02 may indicate whether to use a hop-by-hop ARQ function or an end-to-end ARQ function by using the indicator of the RRCConnectionSetup message. Also, when the end-to-end ARQ function is set, the parent wireless node 1f-02 may indicate whether to perform only a function of dividing or directly delivering received RLC layer device data or to perform an ARQ function at a child node as an end. Also, the parent wireless node 1f-02 may indicate which ARQ function is to be used as a default function, and when an ARQ function is not set in the message, may pre-determine to use one of the hop-by-hop ARQ function and the end-to-end ARQ function as a default function. Also, the parent wireless node 1f-02 may indicate whether the child wireless node 1f-01 is to use a data division function by using the RRCConnectionSetup message, and may indicate whether to activate (or use) respective functions of the RLC layer devices described with reference to FIG. 2 or FIG. 4.

In an embodiment of the disclosure, the RRCConnectionSetup message (or the RRCResume message) may include an indicator indicating whether an adaptation layer device is to use a data concatenation function. Also, the RRCConnectionSetup message may include an indicator indicating whether to set a header of the adaptation layer device, and may designate a type of the header. For example, the parent wireless node 1f-02 may set which information about a terminal identifier, a terminal bearer identifier, a QoS identifier, a wireless node identifier, a wireless node address, or QoS information is to be included in the header by using the RRCConnectionSetup message. In an embodiment of the disclosure, the parent wireless node 1*f*-02 may set to omit the header in order to reduce overhead.

The parent wireless node 1*f*-02 may set an RLC channel to be used between a transmitting adaptation layer device and a receiving adaptation layer device, to be used between the child wireless node 1*f*-01 and the parent wireless node 1*f*-02, or to be used between the terminal 1*f*-01 and the wireless node 1*f*-02, by using the RRCConnectionSetup message (or the RRCResume message). In detail, the RRCConnectionSetup may include the number of available RLC channels, an available RLC channel identifier, or mapping information (e.g., a terminal identifier, a terminal bearer identifier, QoS information, or QoS identifier mapping information) of data mapped to an RLC channel. The RLC channel may be defined as a channel through which data of several terminals is combined based on QoS information and is delivered in accordance with QoS, and may be defined as a channel through which data is combined for each terminal and is delivered.

In operation 1*f*-15, the terminal or the child wireless node 1*f*-01 that establishes RRC connection may transmit an RRCConnetionSetupComplete message (or an RRCResumeComplete message) to the parent wireless node 1*f*-02.

The RRCConnetionSetupComplete message may include a SERVICE REQUEST message that is a control message by using which the terminal or the child wireless node 1*f*-01 requests an access and mobility management function (AMF) or MME for bearer configuration for a predetermined service. In an embodiment of the disclosure, the parent wireless node 1*f*-02 may transmit the SERVICE REQUEST message included in the RRCConnetionSetupComplete message to the AMF or MME. In an embodiment of the disclosure, the AMF or MME may determine whether to provide a service requested by the terminal or the child wireless node 1*f*-01.

When the AMF or MME determines that the service requested by the terminal or the child wireless node 1*f*-01 is to be provided, the AMF or MME may transmit an INITIAL CONTEXT SETUP REQUEST message to the parent wireless node 1*f*-02. The INITIAL CONTEXT SETUP REQUEST message may include information such as QoS information to be applied during DRB configuration or security-related information (e.g., a security key or a security algorithm) to be applied to a DRB.

In operations 1*f*-20 through 1*f*-25, the parent wireless node 1*f*-02 may exchange a SecurityModeCommand message and a SecurityModeComplete message with the terminal or the child wireless node 1*f*-01 for security configuration. In operation 1*f*-30, when security configuration is completed, the parent wireless node 1*f*-02 may transmit an RRCConnectionReconfiguration message to the terminal or the child wireless node 1*f*-01.

When the terminal or the child wireless node 1*f*-01 performs handover, the parent wireless node 1*f*-02 may set an indicator indicating whether to retransmit pre-configured RRC messages to a target parent wireless node or cell, by using the RRCConnectionReconfiguration message. For example, the parent wireless node 1*f*-02 may instruct to retransmit RRC messages transmitted within several seconds before a handover indication message is received, before handover is performed, or before RRC messages are received. Also, the indicator may be set to each of the pre-configured RRC messages. That is, multiple indicators may respectively indicate whether to retransmit RRC messages. Alternatively, whether to perform retransmission may be indicated by using a bitmap indicating each RRC message.

In an embodiment of the disclosure, an indicator instructing to perform a PDCP data recovery procedure may be included in PDCP configuration information of the RRCConnectionReconfiguration message. Also, an indicator indicating whether to perform the PDCP data recovery procedure on an SRB or a DRB may be included in bearer configuration information of the RRCConnectionReconfiguration message. Also, an indicator indicating whether to discard data remaining in the PDCP layer device for the SRB or the DRB may be included in the bearer configuration information of the RRCConnectionReconfiguration message.

In an embodiment of the disclosure, an indicator indicating whether to perform cumulative retransmission or selective retransmission on an AM DRB when a PDCP reestablishment procedure is performed may be included in the bearer configuration information of the RRCConnectionReconfiguration message.

In an embodiment of the disclosure, the RRCConnectionReconfiguration message may include an indicator indicating which ARQ function is to be used in the child wireless node, and may indicate whether to use a hop-by-hop ARQ function or an end-to-end ARQ function by using the indicator. Also, when the end-to-end ARQ function is set, the parent wireless node 1*f*-02 may indicate whether to perform only a function of dividing or directly delivering received RLC layer device data or to perform an ARQ function at a child node as an end. Also, the parent wireless node may indicate which ARQ function is to be used as a default function, and when an ARQ function is not set in the RCConnectionReconfiguration message, may pre-determine to use one of the hop-by-hop ARQ function and the end-to-end ARQ function as a default function. Also, the parent wireless node 1*f*-02 may indicate whether the child wireless node 1*f*-01 is to use a data division function by using the RCConnectionReconfiguration message, and may indicate whether to activate (or use) respective functions of the RLC layer devices described with reference to FIG. 2 or 1D.

In an embodiment of the disclosure, the RRCConnectionReconfiguration message may include an indicator indicating whether an adaptation layer device is to use a data concatenation function. Also, the RRCConnectionReconfiguration message may include an indicator indicating whether to set a header of the adaptation layer device, and the parent wireless node 1*f*-02 may designate a type of the header. For example, the parent wireless node 1*f*-02 may set which information about a terminal identifier, a terminal bearer identifier, a QoS identifier, a wireless node identifier, a wireless node address, or QoS information is to be included in the header. The parent wireless node 1*f*-02 may set to omit the header in order to reduce overhead.

In an embodiment of the disclosure, the RRCConnectionReconfiguration message may include an RLC channel to be used between a transmitting adaptation layer device and a receiving adaption layer device, to be used between the child wireless node 1*f*-01 and the parent wireless node 1*f*-02, or to be used between the terminal 1*f*-01 and the wireless node 1*f*-01. In an embodiment of the disclosure, the RRCConnectionReconfiguration message may include the number of available RLC channels, an available RLC channel identifier, or mapping information (e.g., a terminal identifier, a terminal bearer identifier, QoS information, or QoS identifier mapping information) of data mapped to an RLC channel. The RLC channel may be defined as a channel through which data of several terminals is combined based on QoS information and is delivered in accordance with QoS, and may be defined as a channel through which data is combined for each terminal and is delivered.

The RRCConnectionReconfiguration message may include configuration information of a DRB where user data is to be processed. In operation 1*f*-35, the terminal or the child wireless node 1*f*-01 may set the DRB by using the configuration information, and may transmit an RRCConnectionReconfigurationComplete message to the parent wireless node 1*f*-02. The parent wireless node 1*f*-02 completing DRB configuration with the terminal or the child wireless node 1*f*-01 may transmit an INITIAL CONTEXT SETUP COMPLETE message to the AMF or MME and may complete connection.

In operation 1*f*-40, when all of the above processes are completed, the terminal or the child wireless node 1*f*-01 may transmit/receive data to/from the parent wireless node 1*f*-02 through a core network. According to an embodiment of the disclosure, a data transmission process may roughly include three operations, i.e., RRC connection establishment, security configuration, and DRB configuration.

In operation 1*f*-45, in order to renew, add, or change configuration to the terminal or the child wireless node 1*f*-01 for a certain reason, the parent wireless node 1*f*-02 may transmit an RRCConnectionReconfiguration message.

In an embodiment of the disclosure, when the terminal or the child wireless node 1*f*-01 performs handover, the parent wireless node 1*f*-02 may set an indicator indicating whether to retransmit pre-configured RRC messages to a target parent wireless node or cell, in the RRCConnectionReconfiguration message. For example, the parent wireless node 1*f*-02 may instruct to retransmit RRC messages transmitted within several seconds before a handover indication message is received, before handover is performed, or before RRC messages are received. The indicator may be set to each of the pre-configured RRC messages. That is, multiple indicators may respectively indicate whether to retransmit RRC messages. In an embodiment of the disclosure, whether to perform retransmission may be indicated by using a bitmap indicating each RRC message.

In an embodiment of the disclosure, an indicator instructing to perform a PDCP data recovery procedure may be included in PDCP configuration information of the RRCConnectionReconfiguration message. Also, an indicator indicating whether to perform the PDCP data recovery procedure on an SRB or a DRB may be included in bearer configuration information of the RRCConnectionReconfiguration message. Also, an indicator indicating whether to discard data remaining in the PDCP layer device for the SRB or the DRB may be included in the bearer configuration information of the RRCConnectionReconfiguration message.

Also, in an embodiment of the disclosure, an indicator indicating whether to perform cumulative retransmission or selective retransmission on an AM DRB when a PDCP reestablishment procedure is performed may be included in the bearer information of the RRCConnectionReconfiguration message.

Also, in an embodiment of the disclosure, the RRCConnectionReconfiguration message may include an indicator indicating which ARQ function is to be used in the child wireless node, and may indicate whether to use a hop-by-hop ARQ function or an end-to-end ARQ function by using the indicator.

In an embodiment of the disclosure, when the end-to-end ARQ function is set, the parent wireless node may indicate whether to perform only a function of dividing or directly delivering received RLC layer device data or to perform an ARQ function at a child node as an end. Also, the parent wireless node may indicate which ARQ function is to be used as a default function, and when an ARQ function is not set in the RCConnectionReconfiguration message, may predetermine one of the hop-by-hop ARQ function and the end-to-end ARQ function as a default function. Also, the RCConnectionReconfiguration message may indicate whether the child wireless node is to use a data division function, and may indicate whether to activate (or use) respective functions of the RLC layer devices described with reference to FIG. 2 or 1D.

In an embodiment of the disclosure, the RRCConnectionReconfiguration message may include an indicator indicating whether an adaptation layer device is to use a data concatenation function. Also, the RRCConnectionReconfiguration message may include an indicator indicating whether to set a header of the adaptation layer device, and may designate a type of the header. For example, the parent wireless node may set which information about a terminal identifier, a terminal bearer identifier, a QoS identifier, a wireless node identifier, a wireless node address, or QoS information is to be included in the header. In an embodiment of the disclosure, the parent wireless node may set to omit the header in order in order to reduce overhead.

In an embodiment of the disclosure, the parent wireless node may set an RLC channel to be used between a transmitting adaptation layer device and a receiving adaptation layer device, to be used between the child wireless node and the parent wireless node, or to be used between the terminal and the wireless node by using the RRCConnectionReconfiguration message. In detail, the parent wireless node may set the number of available RLC channels, an available RLC channel identifier, or mapping information (e.g., a terminal identifier, a terminal bearer identifier, QoS information, or QoS identifier mapping information) of data mapped to an RLC channel. The RLC channel may be defined as a channel through which data of several terminals is combined based on QoS information and is delivered in accordance with QoS, and may be defined as a channel through which data is combined for each terminal and is delivered.

In the disclosure, a bearer may include an SRB and a DRB. In an embodiment of the disclosure, the term "UM DRB" refers to a DRB using an RLC layer device that operates in an UM, and the term "AM DRB" refers to a DRB using an RLC layer device that operates in an AM.

Figure 7:
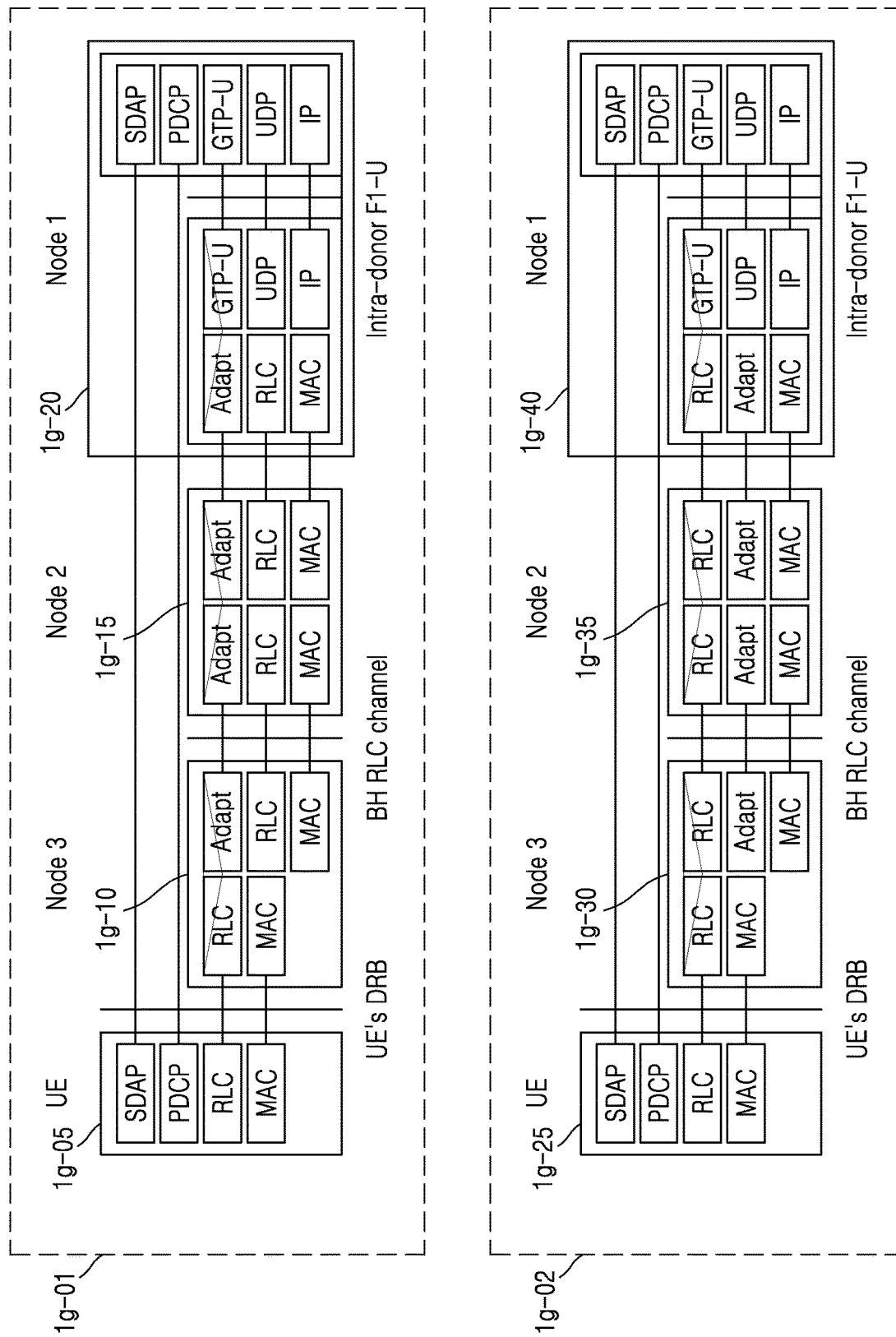
FIG. 7 is a diagram illustrating a protocol layer apparatus which each wireless node may have in a next-generation mobile communication system according to an embodiment of the disclosure.

FIG. 7 is a diagram illustrating a protocol layer device which each wireless node may have in a next-generation mobile communication system according to an embodiment of the disclosure.

More particularly, FIG. 7 is a diagram illustrating a protocol layer device which each wireless node may have in a next-generation mobile communication system supporting wireless backhaul according to an embodiment of the disclosure.

Referring to FIG. 7, protocol layer device structures of wireless nodes supporting wireless backhaul may be roughly classified into two types. The two types may be divided according to a position of an adaptation (ADAP) layer device. In an embodiment of the disclosure, the protocol layer device structures may include a protocol layer device structure 1*g*-01 in which the ADAP layer device is driven over an RLC layer device and a protocol layer device structure 1g-02 in which an ADAP layer device is driven under an RLC layer device.

Referring to FIG. 7, a terminal 1g-05 that is a protocol layer device may drive all of a PHY layer device, a MAC layer device, an RLC layer device, a PDCP layer device, and an SDAP layer device. Wireless nodes (e.g., wireless nodes performing a wireless backhaul function of receiving and transmitting data between a terminal and an IAB donor such as a wireless node 3 1g-10 or a wireless node 2 1g-15) may drive a PHY layer device, a MAC layer device, an RLC layer device, and an ADAP layer device. Also, an uppermost wireless node (e.g., an uppermost node connected to a core network and supporting wireless backhaul for transmitting data such as an IAB donor or an uppermost wireless node 1 1g-20) may drive all of a PHY layer device, a MAC layer device, an RLC layer device, a PDCP layer device, and an SDAP layer device. The uppermost wireless node may include a central unit (CU) and a distributed unit (DU) that are connected by wire. In an embodiment of the disclosure, the CU may drive the SDAP layer device and the PDCP layer device, and the DU may drive the RLC layer device, the MAC layer device, and the PHY layer device.

Each ADAP layer device may distinguish a plurality of bearers of a plurality of terminals, and may map the bearers to an RLC channel. Also, when the ADAP layer device distinguishes the plurality of bearers of the plurality of terminals, the ADAP layer device may combine data based on terminals or QoS, may map the data to one RLC channel so that data is combined and processed, and may combine the data mapped to the one RLC channel by using a data concatenation function to reduce overhead. In this case, the term "data concatenation function" may refer to a function for configuring one or a small number of headers for a plurality of pieces of data, distinguishing each piece of data by indicating a header field indicating concatenated data, and not configuring a header for each data unnecessarily to reduce overhead.

In the protocol layer device structure 1g-01 of FIG. 7, in order to process data received from the terminal 1g-05, the wireless node 3 1g-10 may drive the same first RLC layer devices as first RLC layer devices corresponding to each data bearer of the terminal 1g-05. Also, the wireless node 3 1g-10 may process pieces of data received from a plurality of RLC layer devices in the ADAP layer device, and may map the data to a new RLC channel and corresponding second RLC layer devices. The ADAP layer device of the wireless node 3 1g-10 may distinguish a plurality of bearers of a plurality of terminals and may map the bearers to an RLC channel. Also, when the ADAP layer device distinguishes the plurality of bearers of the plurality of terminals, the ADAP layer device may combine data based on terminals or QoS, and may map the data to one RLC channel so that the second RLC layer devices combine and process data. The RLC channel may be defined as a channel through which data of several terminals is combined based on QoS information and is delivered in accordance with QoS, and may be defined as a channel through which data is combined for each terminal and is delivered.

The wireless node 3 1g-10 may perform a procedure of distributing uplink transmission resources received from a parent wireless node. In an embodiment of the disclosure, the wireless node 3 1g-10 may perform a procedure of distributing uplink transmission resources according to QoS information of the RLC channel (or the second RLC layer device), priority, the amount of transmittable data (e.g., the amount of data allowed in this uplink transmission resource, or a token), or the amount of data stored in a buffer for the RLC channel (or the second RLC layer device). The wireless node 3 1g-10 may transmit data of each RLC channel to the parent wireless node by using a division function or a concatenation function in accordance with the distributed transmission resources.

The term "first RLC layer device" may refer to an RLC layer device that process data corresponding to a bearer in the same manner as that of an RLC layer device corresponding to each bearer of a terminal, and the term "second RLC layer device" may refer to an RLC layer device that processes data mapped based on mapping information set by a terminal, QoS, or a parent wireless node in an ADAP layer device.

In the protocol layer device structure 1g-01 of FIG. 7, the wireless node 2 1g-15 may drive second RLC layer devices corresponding to second RLC layer devices of a child wireless node (i.e., the node 3 1g-10) and may process data in accordance with the RLC channel.

In the protocol layer device structure 1g-01 of FIG. 7, the uppermost wireless node 1 1g-20 may drive second RLC layer devices corresponding to second RLC layer devices of a child wireless node (i.e., the wireless node 2 1g-15) and may process data in accordance with the RLC channel. The ADAP layer device of the uppermost wireless node 1 1g-20 may map data processed for the RLC channel to PDCP layer devices in accordance with each bearer of each terminal. The PDCP layer device of the uppermost wireless node 1 1g-20 corresponding to each bearer of each terminal may process received data, may deliver the data to the SDAP layer device, may process the data, and may deliver the data to the core network.

In the protocol layer device structure 1g-02 of FIG. 7, in order to process data received from a terminal 1g-25, a wireless node 3 1g-30 may drive the same first RLC layer devices as first RLC layer devices corresponding to each data bearer of the terminal 1g-25. The wireless node 3 1g-30 may process data received from a plurality of RLC layer devices by driving the first RLC layer devices in the same manner. Also, an ADAP layer device of the wireless node 3 1g-30 may process data processed from the first RLC layer devices and may map the data to new RLC channels. The ADAP layer device may distinguish a plurality of bearers of a plurality of terminals and may map the bearers to an RLC channel. Also, when the ADAP layer device distinguishes the plurality of bearers of the plurality of terminals, the ADAP layer device may combine data based on terminals or QoS, may map the data to one RLC channel so that data is combined and processed. The RLC channel may be defined as a channel through which data of several terminals is combined based on QoS information and is delivered in accordance with QoS, and may be defined as a channel through which data is combined for each terminal and is delivered.

The wireless node 3 1g-30 may perform a procedure of distributing uplink transmission resources received from a parent wireless node. In an embodiment of the disclosure, the wireless node 3 1g-30 may perform a procedure of distributing uplink transmission resources according to QoS information of the RLC channel, priority, the amount of transmittable data (e.g., the amount of data allowed in this uplink transmission resource, or a token), or the amount of data stored in a buffer for the RLC channel. The wireless node 3 1g-30 may transmit data of each RLC channel to the parent wireless node by using a division function or a concatenation function in accordance with the distributed transmission resources.

In the protocol layer device structure 1g-02 of FIG. 7, a wireless node 2 1g-35 may process received data corresponding to an RLC channel of a child wireless node (i.e., the wireless node 3 1g-30) in accordance with the RLC channel. An ADAP layer device of the wireless node 2 1g-35 may map data received for the RLC channel to first RLC layer devices in accordance with each bearer of each terminal. The first RLC layer device corresponding to each bearer of each terminal of the wireless node may process received data, may deliver again the data to a transmitting first RLC layer device, may deliver again the data, may process the data, and may deliver again the data to the ADAP layer device. The ADAP layer device may map again data received from the plurality of RLC layer devices to RLC channels, and may perform data transmission to a next parent wireless node according to distribution of uplink transmission resources.

In the protocol layer device structure 1g-02 of FIG. 7, an uppermost wireless node 1 1g-40 may process data received for an RLC channel of a child wireless node (i.e., the wireless node 2 1g-35) in accordance with the RLC channel. An ADAP layer device of the uppermost wireless node 1 1g-40 may map data received for the RLC channel to first RLC layer devices corresponding to each bearer of each terminal.

In an embodiment of the disclosure, the wireless node may drive the first RLC layer devices corresponding to each bearer of each terminal, may process received data, and may deliver the data to PDCP layer devices in accordance with each bearer of each terminal. The PDCP layer device of the uppermost wireless node 1 1g-40 corresponding to each bearer of each terminal may process received data, may deliver the data to the SDAP layer device, may process the data, and may deliver the data to the core network.

Methods of delivering data without loss in a wireless link of a next-generation mobile communication system supporting wireless backhaul will now be described.

Figure 8:
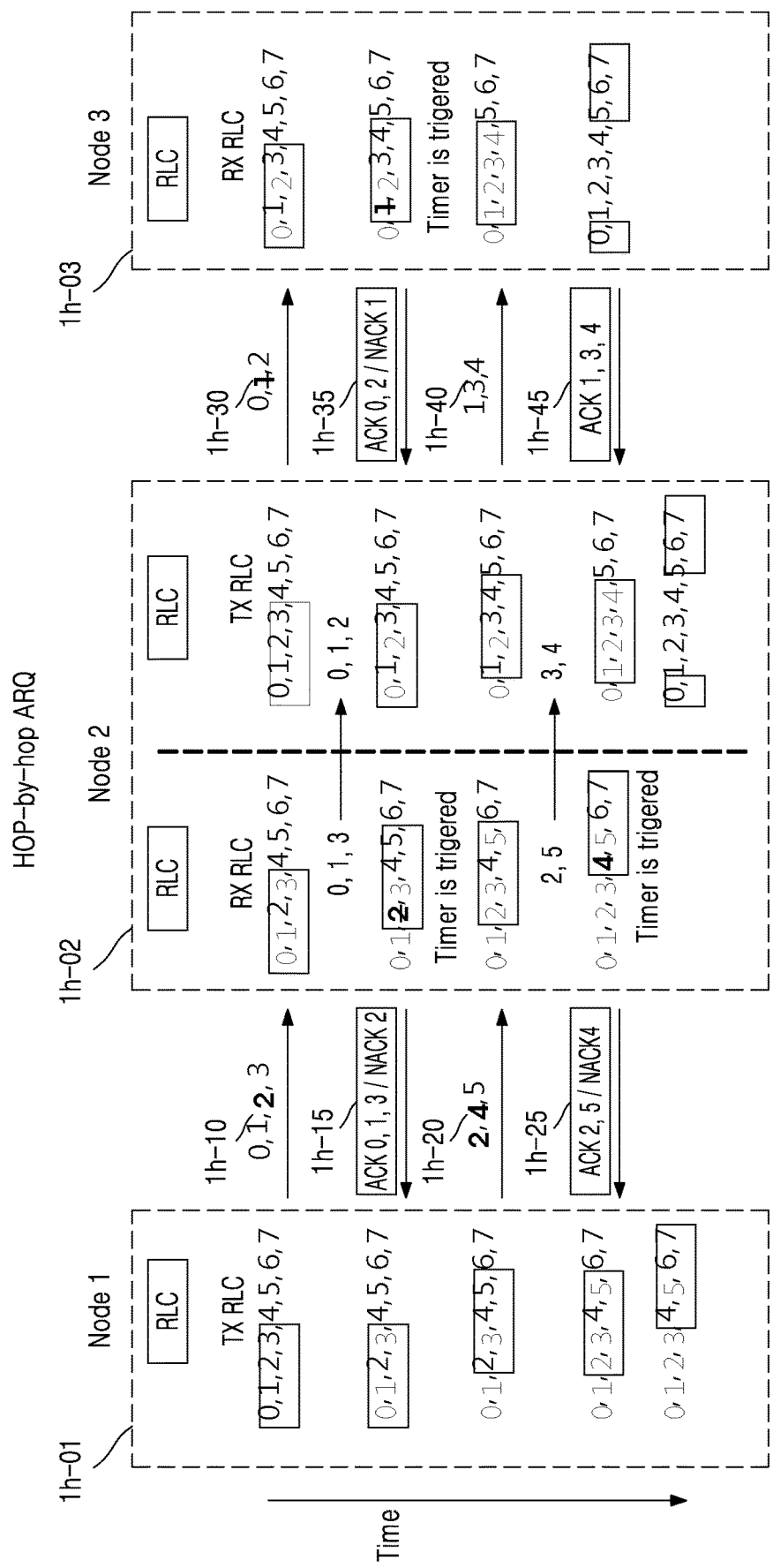
FIG. 8 is a diagram illustrating a method of delivering data without loss at a data level between radio link control (RLC) layer apparatuses in a wireless link of a next-generation mobile communication system according to an embodiment of the disclosure.

FIG. 8 is a diagram illustrating a method of delivering data without loss at a data level between RLC layer devices in a wireless link of a next-generation mobile communication system according to an embodiment of the disclosure.

More particularly, FIG. 8 is a diagram illustrating a first embodiment (hop-by-hop ARQ) that delivers data without loss at a data level between RLC layer devices, in a wireless link of a next-generation mobile communication system supporting wireless backhaul. FIG. 8 illustrates a scenario in which data is transmitted from an RLC layer device of a wireless node 1 to an RLC layer device of a wireless node 3.

The first embodiment of the disclosure may be a hop-by-hop ARQ method, and according to the embodiment of the disclosure, data may be delivered without loss in a wireless link of a next-generation mobile communication system supporting wireless backhaul.

The hop-by-hop ARQ method may independently perform an ARQ function in a wireless link between two wireless nodes (e.g., a terminal, and an IAB node or an IAB donor). For example, when data is transmitted from a wireless node 1 (e.g., a terminal) 1h-01 of FIG. 8 and is delivered through a wireless node 2 (e.g., an IAB node) 1h-02 to a wireless node 3 (e.g., an IAB donor) 1h-03, there are three wireless nodes and two wireless links are generated. In an embodiment of the disclosure, two wireless nodes may independently drive an ARQ function for each wireless link of the two wireless links.

That is, in a wireless link between the wireless node 1 1h-01 and the wireless node 2 1h-02, the wireless node 1 1h-01 may drive a transmission RLC window, may allocate an independent RLC sequence number (SN), may deliver data, may perform a polling function and a division function, may receive an RLC status report (e.g., an RLC status PDU), and may operate the transmission RLC window based on an RLC ACK of the RLC status report.

Also, in the wireless link between the wireless node 1 1h-01 and the wireless node 2 1h-02, the wireless node 2 1h-02 may drive a reception RLC window, may check an RLC SN for received data, may perform a loss detection function, may drive a timer when an RLC SN gap occurs, may configure and deliver an RLC status report when the timer expires, may configure an RLC status report corresponding to polling when the polling is checked in an RLC header, may indicate whether delivery is successful, and may request a transmitting RLC layer device to perform retransmission and transmission window movement.

Also, in a wireless link between the wireless node 2 (e.g., an IAB node) 1h-02 and the wireless node 3 (e.g., an IAB donor) 1h-03, the wireless node 2 1h-02 may drive a transmission RLC window, may allocate an independent RLC SN, may deliver data, may perform a polling function and a division function, may receive an RLC status report (e.g., an RLC status PDU) and may operate the transmission RLC window based on an RLC ACK of the RLC status report.

Also, in the wireless link between the wireless node 2 1h-02 and the wireless node 3 1h-03, the wireless node 3 1h-03 may drive a reception RLC window, may check an RLC SN for received data, may perform a loss detection function, may drive a timer when an RLC SN gap occurs, may configure and deliver an RLC status report when the timer expires, may configure an RLC status report corresponding to polling when the polling is checked in an RLC header, may indicate whether delivery is successful, and may request a transmitting RLC layer device to perform retransmission and transmission window movement.

Referring to FIG. 8, the wireless node 2 1h-02 is connected via a wireless link to the wireless node 1 1h-01, and is connected via a wireless link to the wireless node 3 1h-03.

The wireless node 2 1h-02 may process data of an RLC layer device received from the wireless node 1 1h-01. In detail, the wireless node 2 1h-02 may read an RLC header, may interpret the RLC header, and may allocate a new RLC SN, may newly configure the new RLC header, may generate data of a transmitting RLC layer device, and may transmit data to a receiving RLC layer device of the wireless node 3 1h-03.

Also, the wireless node 2 1h-02 may process data of an RLC layer device received from the wireless node 3 1h-03. In detail, the wireless node 2 1h-02 may read and interpret an RLC header, may allocate a new RLC SN, may newly configure the new RLC header, may generate data of a transmitting RLC layer device, and may transmit data to a receiving RLC layer device of the wireless node 1 1h-01.

That is, when the hop-by-hop ARQ method is used, wireless nodes that transmit/receive data in the middle may receive data of an RLC layer device and may reconfigure and transmit data, and may discard an RLC header received during reconfiguration, may generate a new RLC header, and may configure the new RLC header along with the data and send the same. In order to record mapping information of an RLC SN of the discarded RLC header and an RLC SN of the newly generated RLC header, the wireless nodes may manage and maintain a mapping table.

In an embodiment of the disclosure, the hop-by-hop ARQ method that is the first embodiment of the disclosure may have the following functions.

1. A wireless node that transmits data for each wireless link and a wireless node that receives data independently drive an ARQ function.

2. An independent RLC SN is allocated and used for each wireless link.

3. A receiving RLC layer device of a wireless node that receives data for each wireless link generates and transmits an independent RLC status report, and a transmitting RLC layer device of a wireless node that transmits data receives the RLC status report and performs retransmission and transmission window movement.

4. A function of retransmitting data for each wireless link is driven.

5. Wireless nodes that transmit data from one wireless link to another wireless link may receive data of an RLC layer device and may reconfigure and transmit data, and may discard an RLC header received during reconfiguration, may generate a new RLC header, and may configure the new RLC header along with the data and send the same. Also, a mapping table may be managed and maintained to record mapping information of an RLC SN of the discarded RLC header and an RLC SN of the newly generated RLC header.

6. An RLC header may be newly configured by updating an RLC header field value or inserting an additional field according to a data division function of the newly configured RLC header when the data division function is required according to an uplink transmission resource.

Referring to FIG. 8, an embodiment based on the hop-by-hop ARQ method that is the first embodiment of the disclosure will be described in more detail.

In the embodiment of the disclosure, for convenience of explanation, it is assumed that wireless nodes use an RLC SN having a 3-bit length in a network supporting wireless backhaul. That is, 0, 1, 2, 3, 4, 5, 6, and 7 may be allocated and used as RLC SNs, and a size of an RLC window may be 4 that is half a length of the RLC SNs.

First, a transmitting RLC layer device of the wireless node 1 1h-01 may allocate an RLC SN to each data received from an upper layer device. Data corresponding to the RLC SNs 0, 1, 2, and 3 may be transmitted to a parent wireless node (i.e., the wireless node 2 1h-02) through a wireless link 1h-10.

In the above wireless link, it is assumed that data corresponding to the RLC SN 2 is lost. A receiving RLC layer device of the parent wireless node (i.e., the wireless node 2 1h-02) may receive data corresponding to the RLC SNs 0, 1, and 3, may determine there is the probability that the RLC SN 2 is lost, and may trigger a timer.

When data corresponding to the RLC SN 2 does not arrive until the timer expires, the receiving RLC layer device of the parent wireless node (i.e., the wireless node 2 1h-02) configures an RLC status report 1h-15 and transmits the RLC status report 1h-15 to the transmitting RLC layer device of the wireless node 1 1h-01. The RLC status report may include information having an ACK indicating that the RLC SNs 0, 1, and 3 are successfully received and having a NACK indicating that data corresponding to the RLC SN 2 is not successfully received.

When the wireless node 1 1h-01 receives the RLC status report, the wireless node 1 1h-01 may move a transmission RLC window based on RLC SN information whose successful delivery is confirmed and may retransmit data corresponding to an RLC SN whose successful delivery is not confirmed. That is, the wireless node 1 1h-01 may perform retransmission on the RLC SN 2 (1h-20). In this case, the wireless node 1 1h-01 may transmit data corresponding to the RLC SN 2 for retransmission and data corresponding to the RLC SNs 4 and 5 for new transmission.

In an embodiment of the disclosure, it is assumed that data corresponding to the RLC SN 4 is lost. The receiving RLC layer device of the wireless node 2 1h-02 may assume loss of the RLC SN 4 and may trigger the timer, and may send an RLC status report when the timer expires and may continuously perform an ARQ function procedure. That is, the receiving RLC layer device of the wireless node 2 1h-configures an RLC status report 1h-25 and transmits the RLC status report 1h-25 to the transmitting RLC layer device of the wireless node 1 1h-01. The RLC status report may include information having an ACK indicating that the RLC SNs 2, and 5 are successfully received and having a NACK indicating that data corresponding to the RLC SN 4 is not successfully received.

When the wireless node 2 1h-02 receives data corresponding to the RLC SNs 0, 1, and 3 received from the wireless node 1 1h-01, the wireless node 2 1h-02 may read and remove an RLC header. The wireless node 2 1h-02 may newly configure an RLC header by allocating 0, 1, 2, and 3 as new RLC SNs for a wireless link between the wireless node 2 1h-02 and the wireless node 3 1h-03, may configure the RLC header along with data, and may transmit the same to the wireless node 3 1h-03. An ARQ operation between the wireless node 1 1h-01 and the wireless node 2 1h-02 may be independently performed in 1h-30, 1h-35, 1h-40, and 1h-45 between the wireless node 2 1h-02 and the wireless node 3 1h-03.

Figure 9:
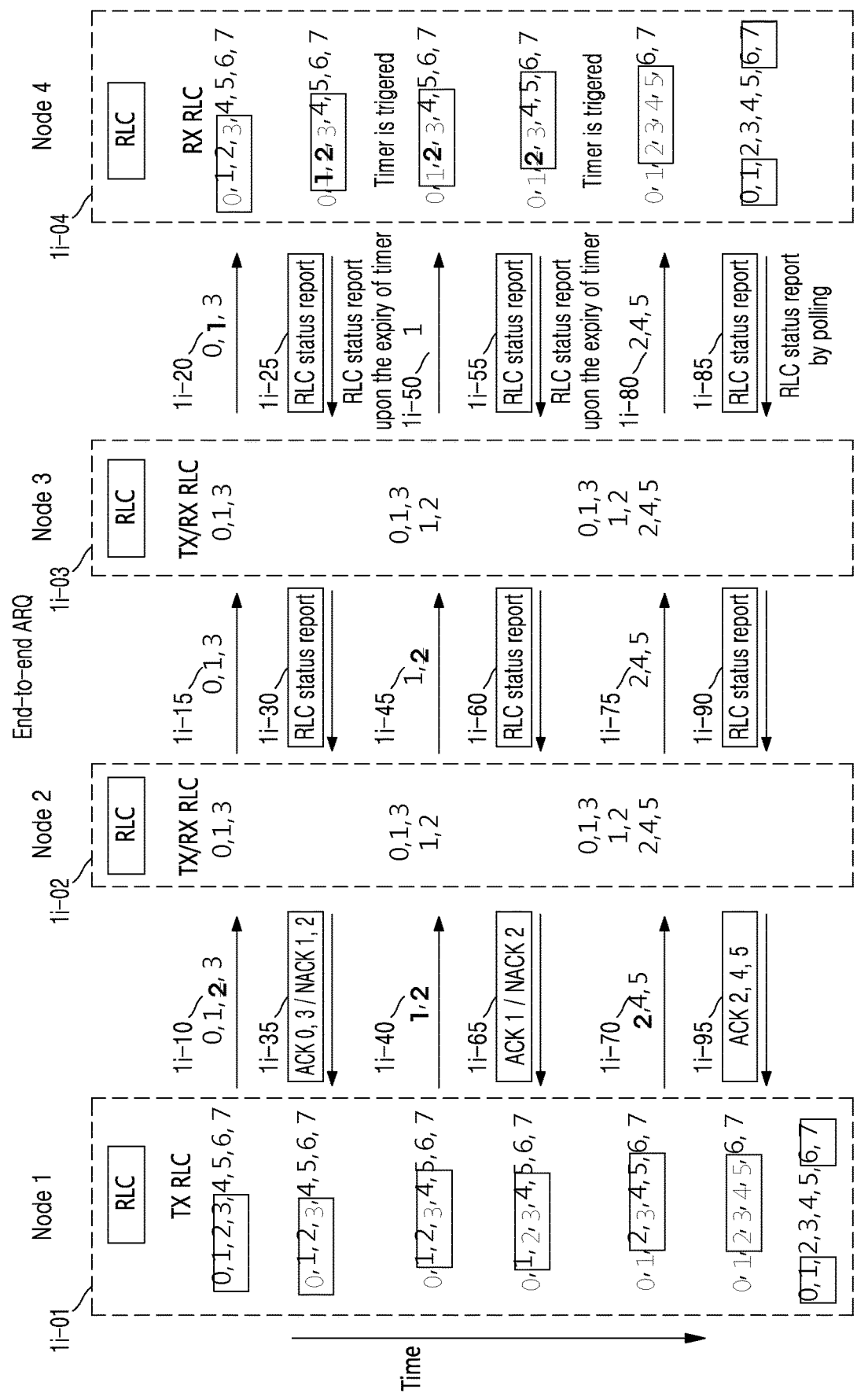
FIG. 9 is a diagram illustrating a method of delivering data without loss at a data level between RLC layer apparatuses in a wireless link of a next-generation mobile communication system according to an embodiment of the disclosure.

FIG. 9 is a diagram illustrating a method of delivering data without loss at a data level between RLC layer devices in a wireless link of a next-generation mobile communication system, according to an embodiment of the disclosure.

More particularly, FIG. 9 is a diagram illustrating a second embodiment (end-to-end ARQ) that delivers data without loss at a data level between RLC layer devices in a wireless link of a next-generation mobile communication system supporting wireless backhaul. FIG. 9 illustrates a scenario in which data is transmitted from an RLC layer device of a wireless node 1 to an RLC layer device of a wireless node 4.

The second embodiment of the disclosure may be an end-to-end ARQ method, and according to the embodiment of the disclosure, data may be delivered without loss in a wireless link of a next-generation mobile communication system supporting wireless backhaul.

The end-to-end ARQ method may perform one ARQ function in wireless links between two end wireless nodes (e.g., a terminal and an IAB donor). For example, when data is transmitted from a wireless node 1 (e.g., a terminal) 1i-01 of FIG. 9 and is delivered through a wireless node 2 (e.g., an IAB node) 1i-02 and a wireless node 3 (e.g., an IAB node) 1i-03 to a wireless node 4 (e.g., an IAB donor) 1i-04, there are four wireless nodes and three wireless links are generated.

In an embodiment of the disclosure, one ARQ operation may be performed only by the wireless node 1 1i-01 and the wireless node 4 1i-04 corresponding to ends of a wireless link. In detail, the wireless node 1 1i-01 may drive a transmission RLC window in a transmitting RLC layer device, may allocate an independent RLC SN, may deliver data, may perform a polling function and a division function, may receive an RLC status report (e.g., an RLC status PDU), and may operate the transmission RLC window based on an RLC ACK of the RLC status report.

Also, the wireless node 4 1i-04 may drive a reception RLC window for all wireless links between the wireless node 1 1i-01 and the wireless node 4 1i-04, may check an RLC SN for received data, may perform a loss detection function, may drive a timer when an RLC SN gap occurs, may configure and deliver an RLC status report when the timer expires, may configure an RLC status report corresponding to polling when the polling is checked in an RLC header, may indicate whether delivery is successful, and may request a transmitting RLC layer device to perform retransmission and transmission window movement.

In summary, according to the end-to-end ARQ method of the embodiment of the disclosure, an ARQ operation may be driven only between end wireless nodes, and intermediate wireless nodes (e.g., a wireless node 2 1i-02 and a wireless node 3 1i-03) that transmit/receive and deliver data between the end wireless nodes may perform only a function of receiving and delivering data. That is, when the intermediate wireless nodes according to an embodiment of the disclosure receive data of an RLC layer device, the intermediate wireless nodes may read and interpret an RLC header, and may deliver again data (e.g., an RLC PDU) of the RLC layer device to a next parent wireless node or a next child wireless node.

When a data division function is required due to the shortage of a transmission resource, the intermediate wireless nodes may reconfigure the RLC header by updating a field of the RLC header or adding a new field, may configure the RLC header along with the data, and may deliver the same to a next parent wireless node or a next child wireless node. Accordingly, in the end-to-end ARQ method, one RLC SN may be shared and used between end wireless nodes and intermediate wireless nodes.

In an embodiment of the disclosure, the end-to-end ARQ method that is the second embodiment of the disclosure may have the following functions.

1. One ARQ function is performed between end wireless nodes transmitting/receiving data.

2. One RLC SN is allocated and used over all wireless links, and is shared in intermediate wireless links.

3. When an intermediate wireless node receiving data for each wireless link receives data, the intermediate wireless node reads and interprets an RLC header, and delivers again data (e.g., an RLC PDU) of an RLC layer device to a next parent wireless node or a next child wireless node.

4. When a data division function is required due to the shortage of a transmission resource, an RLC header is reconfigured by updating a field of a received RLC header or adding a new field, is configured along with data, and is delivered to a next parent wireless node or a next child wireless node.

Referring to FIG. 9, an embodiment based on the end-to-end ARQ method that is the second embodiment of the disclosure will be described in more detail.

In the embodiment of the disclosure, for convenience of explanation, it is assumed that wireless nodes use an RLC SN having a 3-bit length in a network supporting wireless backhaul. That is, 0, 1, 2, 3, 4, 5, 6, and 7 may be allocated and used as RLC SNs, and a size of an RLC window may be 4 that is half a length of the RLC SNs.

First, a transmitting RLC layer device of the wireless node 1 1i-01 may allocate an RLC SN to each data received from an upper layer device. Data corresponding to the RLC SNs 0, 1, 2, and 3 may be transmitted to a parent wireless node (e.g., the wireless node 2 1i-02) through a wireless link 1i-10.

In the above wireless link, it is assumed that data corresponding to the RLC SN 2 is lost. In this case, the wireless node 2 1i-02 that is an intermediate wireless node may deliver again data corresponding to the received RLC SNs 0, 1, and 3 to a parent wireless node (e.g., the wireless node 3 1i-03) through a wireless link 1i-15. The wireless node 3 1i-03 that is an intermediate wireless node may deliver again data corresponding to the received RLC SNs 0, 1, and 3 to a parent wireless node (e.g., the wireless node 4 1i-04) through a wireless link 1i-20.

In the wireless link 1i-20, it is assumed that data corresponding to the RLC SN 1 is lost. A receiving RLC layer device of the wireless node 4 1i-04 receives data corresponding to the RLC SNs 0 and 3. The wireless node 4 1i-04 may determine there is the probability that the RLC SNs 1 and 2 are lost and may trigger a timer. When data corresponding to the RLC SNs 1 and 2 does not arrive until the timer expires, the receiving RLC layer device of the wireless node 4 1i-04 that is a parent wireless node may configure an RLC status report and may deliver the RLC status report to the wireless node 3 1i-03 that is an intermediate wireless node through a wireless link 1i-25. The wireless node 3 1i-03 may deliver the received RLC status report to the wireless node 2 1i-02 that is a next wireless node (1i-30), and the wireless node 2 1i-02 may deliver the RLC status report to the wireless node 1 1i-01 (1i-35).

In an embodiment of the disclosure, the transmitting RLC layer device of the wireless node 1 1i-01 may receive the RLC status report configured by the wireless node 4 1i-04 from the wireless node 2 1i-02. The RLC status report may include information having an ACK indicating that the RLC SNs 0 and 3 are successfully received and a NACK indicating that data corresponding to the RLC SNs 1 and 2 is not successfully received.

In an embodiment of the disclosure, when the wireless node 1 1i-01 receives the RLC status report, the wireless node 1 1i-01 may move a transmission RLC window based on RLC SN information whose successful delivery is confirmed and may retransmit data corresponding to an RLC SN whose successful delivery is not confirmed. That is, the wireless node 1 1i-01 may perform retransmission on the RLC SNs 1 and 2 (1i-40).

The wireless node 2 1i-02 that is an intermediate wireless node receiving the data may directly deliver the data to the wireless node 3 1i-03 (in a wireless link 1i-45). In a delivery process, it is assumed that data corresponding to the RLC SN 2 is lost in the wireless link 1i-45. The wireless node 3 1i-03 that is an intermediate wireless node receiving the data may directly deliver the data to the wireless node 4 (1i-50).

The wireless node 4 1i-04 that is an end wireless node may move a reception RLC window for the received RLC SN 1, may send again an RLC status report, and may request to retransmit the RLC SN 2 (1i-55). The intermediate wireless nodes may directly deliver the RLC status report to the wireless node 1 1i-01 and may support the wireless node 1 1i-01 to perform retransmission. The above procedures may be similarly performed in 1i-60, 1i-65, 1i-70, 1i-75, 1i-80, 1i-85, 1i-90, and 1i-95.

That is, the intermediate wireless nodes in the end-to-end ARQ method may deliver received data, and an actual ARQ operation may be driven only by end wireless nodes.

The hop-by-hop ARQ method that is the first embodiment of the disclosure and the end-to-end ARQ method that is the second embodiment of the disclosure may have different characteristics.

According to the hop-by-hop ARQ method that is the first embodiment of the disclosure, each wireless node has to perform an ARQ operation for each wireless link and has to maintain an independent RLC SN for each wireless link, thereby increasing a complexity. In contrast, each wireless node may rapidly retransmit missing data in each wireless link.

According to the end-to-end ARQ method that is the second embodiment of the disclosure, only end wireless nodes have to perform an ARQ operation for all wireless links, and one RLC SN has to be shared, maintained, and managed over all wireless links (each wireless link), thereby leading to a low complexity. However, because only end nodes may retransmit missing data in each wireless link, retransmission may be slow.

An end-to-end ARQ operation method having improved retransmission according to an embodiment of the disclosure, based on the second embodiment (the end-to-end ARQ method) having a low complexity, will be described.

Figure 10:
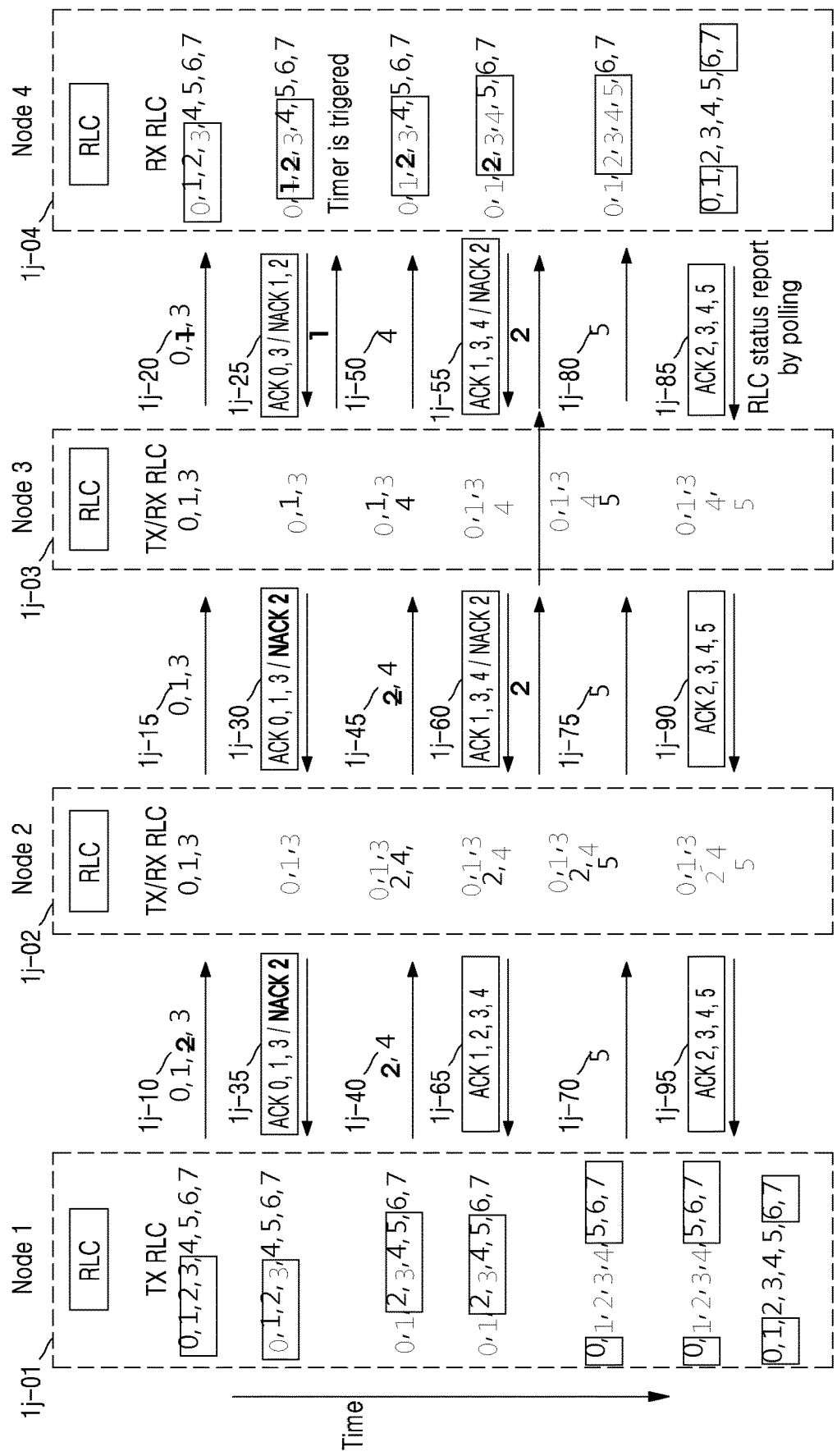
FIG. 10 is a diagram illustrating a method of delivering data without loss at a data level between RLC layer apparatuses in a wireless link of a next-generation mobile communication system according to an embodiment of the disclosure.

FIG. 10 is a diagram illustrating a method of delivering data without loss at a data level between RLC layer devices in a wireless link of a next-generation mobile communication system according to an embodiment of the disclosure.

More particularly, FIG. 10 is a diagram illustrating a third embodiment (enhanced end-to-end ARQ 1) that delivers data without loss at a data level between RLC layer devices, in a wireless link of a next-generation mobile communication system supporting wireless backhaul. FIG. 10 illustrates a scenario in which data is transmitted from an RLC layer device of a wireless node 1 to an RLC layer device of a wireless node 4.

The third embodiment of the disclosure may be an enhanced end-to-end ARQ method, and according to the embodiment of the disclosure, data may be delivered without loss in a wireless link of a next-generation mobile communication system supporting wireless backhaul.

The enhanced end-to-end ARQ method may perform one ARQ function in wireless links between two end wireless nodes (e.g., a terminal and an IAB donor). For example, when data is transmitted from a wireless node 1 (e.g., a terminal) 1j-01 of FIG. 10 and is delivered through a wireless node 2 (e.g., an IAB node) 1j-02 and a wireless node 3 (e.g., an IAB node) 1j-03 to a wireless node 4 (e.g., an IAB donor) 1j-04, there are four wireless nodes and three wireless links are generated. In an embodiment of the disclosure, one ARQ operation may be performed only by the wireless node 1 1j-01 and the wireless node 4 1j-04 corresponding to ends of a wireless link.

That is, the wireless node 1 1j-01 may drive a transmission RLC window in a transmitting RLC layer device, may allocate an independent RLC SN, may deliver data, may perform a polling function and a division function, may receive an RLC status report (e.g., an RLC status PDU), and may operate the transmission RLC window based on an RLC ACK of the RLC status report.

Also, the wireless node 4 1j-04 may drive a reception RLC window for all wireless links between the wireless node 1 1j-01 and the wireless node 4 1j-04, may check an RLC SN for received data, may perform a loss detection function, may drive a timer when an RLC SN gap occurs, may configure and deliver an RLC status report when the timer expires, may configure an RLC status report corresponding to polling when the polling is checked in an RLC header, may indicate whether delivery is successful, and may request the transmitting RLC layer device to perform retransmission and transmission window movement.

In the enhanced end-to-end ARQ method according to an embodiment of the disclosure, when intermediate wireless nodes (e.g., the wireless node 2 1j-02 and the wireless node 3 1j-03) receive the RLC status report, the intermediate wireless nodes may read and interpret the RLC status report. When the intermediate wireless nodes have data corresponding to an RLC SN whose successful delivery is confirmed in the RLC status report, the intermediate wireless nodes may discard the data. Also, when the intermediate wireless nodes have data corresponding to an RLC SN whose successful delivery is not confirmed, the intermediate wireless nodes may retransmit the data, and may reconfigure and deliver the RLC status report.

When an intermediate wireless node reconfigures the RLC status report, the intermediate wireless node may update the retransmitted RLC SN to an ACK, instead of a NACK, and may send the RLC SN. Because the intermediate wireless node corrects information about the retransmitted RLC SN and reconfigures and delivers the RLC status report, a next intermediate wireless node or another wireless node may be prevented from performing unnecessary retransmission.

Also, according to the enhanced end-to-end ARQ method according to an embodiment of the disclosure, intermediate wireless nodes (e.g., the wireless node 2 1j-02 and the wireless node 3 1j-03) that perform an ARQ operation only between end wireless nodes and transmit/receive and deliver data between the end wireless nodes may perform a function of receiving and delivering data. Also, the intermediate wireless nodes may read and interpret an RLC status report in received data. In an embodiment of the disclosure, when the intermediate wireless nodes have data corresponding to an RLC SN whose successful delivery is confirmed in the RLC status report, the intermediate wireless nodes may discard the data. Also, when the intermediate wireless nodes have data corresponding to an RLC SN whose successful delivery is not confirmed, the intermediate wireless nodes may perform retransmission and may reconfigure and deliver the RLC status report, and during reconfiguration of the RLC status report, may update the retransmitted RLC SN to an ACK, instead of a NACK, and may send the RLC SN.

Also, when the intermediate wireless nodes receive data of an RLC layer device, the intermediate wireless nodes may read and interpret an RLC header, and may deliver again data (e.g., an RLC PDU) of the RLC layer device to a next parent wireless node or a next child wireless node. When a data division function is required due to the shortage of a transmission resource, the intermediate wireless nodes may reconfigure the RLC header by updating a field of the RLC header or adding a new field, may configure the RLC header along with the data, and may deliver the same to a next parent wireless node or a next child wireless node.

In an embodiment of the disclosure, the enhanced end-to-end ARQ method that is the third embodiment of the disclosure may have the following functions.

1. One ARQ function is performed between end wireless nodes transmitting/receiving data.

2. One RLC SN is allocated and used over all wireless links, and is shared in intermediate wireless links.

3. When an intermediate wireless node receiving data for each wireless link receives data, the intermediate wireless node reads and interprets an RLC header, and directly delivers again data (e.g., an RLC PDU) of an RLC layer device to a next parent wireless node or a next child wireless node.

4. When a data division function is required due to the shortage of a transmission resource, a wireless node reconfigures an RLC header by updating a field of a received RLC header or adding a new field, configures the RLC header along with data, and delivers the same to a next parent wireless node or a next child wireless node.

5. Each intermediate wireless node may read and interpret an RLC status report received from a parent wireless node or a child wireless node, and may reconfigure the RLC status report.

6. When each wireless node discards received data, the wireless node may read an RLC status report (e.g., an RLC status PDU) received from a parent wireless node (e.g., a parent IAB node) or a child wireless node (e.g., a child IAB node) and may discard only data whose successful delivery is confirmed (RLC ACK) in the RLC status report.

7. Even after each wireless node delivers data received from a parent wireless node (e.g., a parent IAB node) or a child wireless node (e.g., a child IAB node) to the child wireless node (e.g., the child IAB node) or the parent wireless node (e.g., the parent IAB node), the wireless node may store the data, and when required, may perform retransmission.

8. When each wireless node reads and interprets an RLC status report received from a parent wireless node (e.g., a parent IAB node) or a child wireless node (e.g., a child IAB node) and stores data whose successful delivery is not confirmed (NACK) in the RLC status report, the wireless node may perform retransmission.

9. When each wireless node reads and interprets an RLC status report received from a parent wireless node (e.g., a parent IAB node) or a child wireless node (e.g., a child IAB node), stores data whose successful delivery is not confirmed (NACK) in the RLC status report, and performs retransmission, the wireless node may reconfigure or newly generate the RLC status report and may deliver the RLC status report to the child wireless node.

10. When each wireless node reads and interprets an RLC status report received from a parent wireless node (e.g., a parent IAB node) or a child wireless node (e.g., a child IAB node), stores data whose successful delivery is not confirmed (NACK) in the RLC status report, performs retransmission, and reconfigures or newly generates the RLC status report, the wireless node may set an ACK indicating successful delivery to the retransmitted data, instead of a NACK indicating unsuccessful delivery, and may deliver the data with the ACK to a next wireless node.

Referring to FIG. 10, an embodiment based on the enhanced end-to-end ARQ method that is the third embodiment of the disclosure will be described in more detail.

In the embodiment of the disclosure, for convenience of explanation, it is assumed that wireless nodes use an RLC SN having a 3-bit length in a network supporting wireless backhaul. That is, 0, 1, 2, 3, 4, 5, 6, and 7 may be allocated and used as RLC SNs, and a size of an RLC window may be 4 that is half a length of the RLC SNs.

First, a transmitting RLC layer device of the wireless node 1 1*j*-01 may allocate an RLC SN to each data received from an upper layer device. Also, the transmitting RLC layer device of the wireless node 1 1*j*-01 may transmit data corresponding to the RLC SNs 0, 1, 2, and 3 to a parent wireless node (e.g., the wireless node 2 1*j*-02) through a wireless link 1*j*-10.

In the above wireless link, it is assumed that data corresponding to the RLC SN 2 is lost. The wireless node 2 1*j*-02 that is an intermediate wireless node may deliver again data corresponding to the received RLC SNs 0, 1, and 3 to a parent wireless node (e.g., the wireless node 3 1*j*-03) through a wireless link 1*j*-15. The wireless node 3 1*j*-03 that is an intermediate wireless node may deliver again data corresponding to the received RLC SNs 0, 1, and 3 to a parent wireless node (e.g., the wireless node 4 1*j*-04) through a wireless link 1*j*-20.

In the wireless link 1*j*-20, it is assumed that data corresponding to the RLC SN 1 is lost. A receiving RLC layer device of the wireless node 4 1*j*-04 receives data corresponding to the RLC SNs 0 and 3. The receiving RLC layer device of the wireless node 4 1*i*-04 may determine there is the probability that the RLC SNs 1 and 2 are lost and may trigger a timer. When data corresponding to the RLC SNs 1 and 2 does not arrive until the timer expires, the receiving RLC layer device of the wireless node 4 1*j*-04 that is a parent wireless node may configure the RLC status report and may deliver the RLC status report to the wireless node 3 1*j*-03 that is an intermediate wireless node through a wireless link 1*j*-25. The RLC status report may include information having an ACK indicating that the RLC SNs 0 and 3 are successfully received and a NACK indicating that data corresponding to the RLC SNs 1 and 2 is not successfully received.

The wireless node 3 1*j*-03 that is an intermediate wireless node may read and interpret the received RLC status report, and may read the information having the ACK indicating that the RLC SNs 0 and 3 are successfully received and the NACK indicating that data corresponding to the RLC SNs 1 and 2 is not successfully received (1*j*-25).

The wireless node 3 1*j*-03 may discard data corresponding to the RLC SNs 0 and 3 whose successful delivery is confirmed (ACK) based on RLC status report information, and may retransmit data corresponding to the RLC SN 1 stored in the wireless node 3 1*j*-03 from among the RLC SNs 1 and 2 whose successful delivery is not confirmed (NACK) to the wireless node 4 1*j*-04 (1*j*-25). The wireless node 3 1*j*-03 may reconfigure or newly configure the received RLC status report. That is, the reconfigured or newly configured RLC status report may include information having an ACK indicating that the RLC SNs 0, 1, and 3 are successfully received and a NACK indicating that data corresponding to the RLC SN 2 is not successfully received. The reconfigured or newly configured RLC status report may be delivered to the wireless node 2 1*j*-02 that is a next wireless node (1*j*-30).

The wireless node 2 1*j*-02 that is an intermediate wireless node may read and interpret the received RLC status report, and may read the information having the ACK indicating that the RLC SNs 0, 1, and 3 are successfully received and the NACK indicating that data corresponding to the RLC SN 2 is not successfully received (1*j*-30).

The wireless node 2 1*j*-02 may discard data corresponding to the RLC SNs 0, 1, and 3 whose successful delivery is confirmed (ACK) based on RLC status report information, and may not retransmit data corresponding to the RLC SN 2 because the RLC SN 2 whose successful delivery is not confirmed (NACK) is not data stored in the wireless node 2 1*j*-02. Accordingly, the wireless node 2 1*j*-02 may directly deliver the RLC status report to the wireless node 1 1*j*-01 that is a next wireless node (1*j*-35).

The wireless node 1 1*j*-01 may read information of the RLC status report, may move a transmission RLC window, and may retransmit the RLC SN 2. Also, the wireless node 1 1*j*-01 may transmit data corresponding to the RLC SN 4 to the wireless node 2 1*j*-02 (1*j*-40). The wireless node 2 1*j*-02 receiving data corresponding to the RLC SNs 2 and 4 may deliver the data to the wireless node 3 1*j*-03.

In this case, it is assumed that data corresponding to the RLC SN 2 is lost in a wireless link (1*j*-45). The wireless node 3 1*j*-03 may deliver data corresponding to the received RLC SN 4 to the wireless node 4 1*j*-04.

The wireless node 4 1*j*-04 may configure the RLC status report indicating that successful delivery of the RLC SNs 1, 3, and 4 is confirmed and successful delivery of the RLC SN 2 is not confirmed and may transmit the RLC status report to the wireless node 3 1*j*-03. The wireless node 3 1*j*-03 may discard data corresponding to the RLC SN 1 based on RLC status report information, and may deliver the RLC status report to the wireless node 2 1*j*-02 (1*j*-60).

The wireless node 2 1*j*-02 receiving the RLC status report may discard data corresponding to the RLC SN 4 whose successful delivery is confirmed, and may perform retransmission on data corresponding to the RLC SN 2 stored in the wireless node 2 1*j*-02 and may deliver the data to the wireless node 3 1*j*-03. The wireless node 3 1*j*-03 may deliver data to the wireless node 4 1*j*-04 for rapid retransmission, and may reconfigure or newly configure the received RLC status report. That is, the reconfigured or newly configured RLC status report may include information having an ACK indicating that the RLC SNs 1, 2, 3, and 4 are successfully received. The reconfigured or newly configured RLC status report may be delivered to the wireless node 1 1*j*-01 that is a next wireless node (1*j*-65). The above procedures may be similarly performed in 1*j*-70, 1*j*-75, 1*j*-80, 1*j*-85, 1*j*-90, and 1*j*-95.

As described above, in the enhanced end-to-end ARQ method according to the third embodiment of the disclosure, intermediate wireless nodes may perform a function of delivering received data. Also, the intermediate wireless nodes may read and interpret a received RLC status report, and may discard data whose successful delivery is confirmed and is stored therein and may retransmit data whose successful delivery is not confirmed and that is stored therein. When the retransmission is performed, the intermediate wireless nodes may reconfigure or newly configure the received RLC status report and may deliver the RLC status report. According to an embodiment of the disclosure, in a wireless backhaul network, a complexity of wireless nodes may be reduced, rapid retransmission may be performed, and a transmission window may be rapidly moved.

Figure 11:
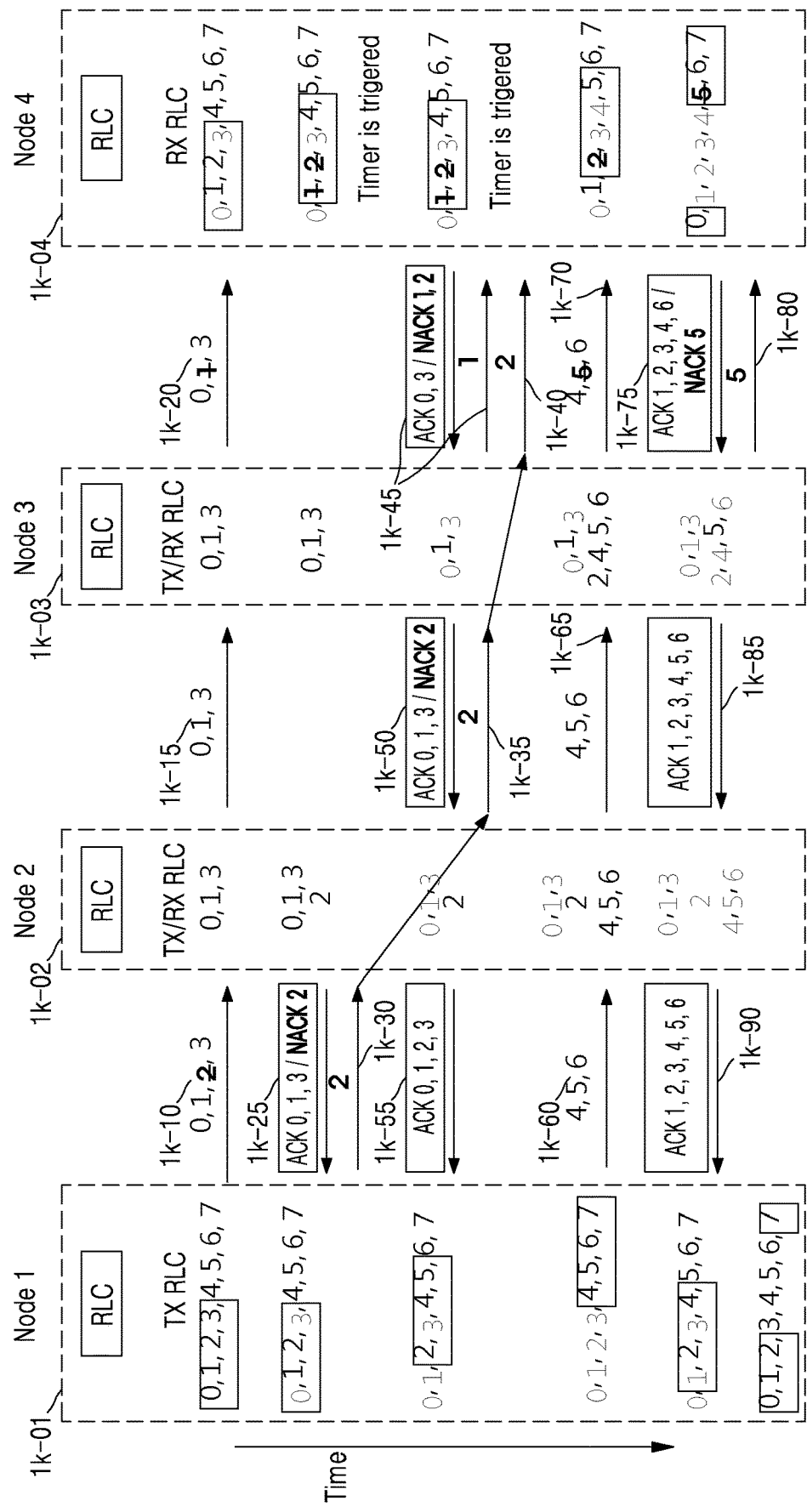
FIG. 11 is a diagram illustrating a method of delivering data without loss at a data level between RLC layer apparatuses in a wireless link of a next-generation mobile communication system according to an embodiment of the disclosure.

FIG. 11 is a diagram illustrating a method of delivering data without loss at a data level between RLC layer devices in a wireless link of a next-generation mobile communication system according to an embodiment of the disclosure.

More particularly, FIG. 11 is a diagram illustrating a fourth embodiment (enhanced end-to-end ARQ 2) that delivers data without loss at a data level between RLC layer devices, in a wireless link of a next-generation mobile communication system supporting wireless backhaul. FIG. 11 illustrates a scenario in which data is transmitted from an RLC layer device of a wireless node 1 to an RLC layer device of a wireless node 4.

The fourth embodiment of the disclosure is another example of an enhanced end-to-end ARQ method. According to the embodiment of the disclosure, data may be delivered without loss in a wireless link of a next-generation mobile communication system supporting wireless backhaul.

The enhanced end-to-end ARQ method may perform one ARQ function in wireless links between two end wireless nodes (e.g., a terminal and an IAB donor). For example, when data is transmitted from a wireless node 1 (e.g., a terminal) 1*k*-01 of FIG. 11 and is delivered through a wireless node 2 (e.g., an IAB node) 1*k*-02 and a wireless node 3 (e.g., an IAB node) 1*k*-03 to a wireless node 4 (e.g., an IAB donor) 1*k*-04, there are four wireless nodes and three wireless links are generated. In an embodiment of the disclosure, one ARQ operation may be performed only by the wireless node 1 1*k*-01 and the wireless node 4 1*k*-04 corresponding to ends of a wireless link.

That is, the wireless node 1 1*k*-01 may drive a transmission RLC window in a transmitting RLC layer device, may allocate an independent RLC SN, may deliver data, may perform a polling function and a division function, may receive an RLC status report (e.g., an RLC status PDU), and may operate the transmission RLC window based on an RLC ACK of the RLC status report.

Also, the wireless node 4 1*k*-04 may drive a reception RLC window for all wireless links between the wireless node 1 1*k*-01 and the wireless node 4 1*k*-04, may check an RLC SN for received data, may perform a loss detection function, may drive a timer when an RLC SN gap occurs, may configure and deliver an RLC status report when the timer expires, may configure the RLC status report corresponding to polling when the polling is checked in an RLC header, and may indicate whether there is successful delivery, and may request the transmitting RLC layer device to perform retransmission and transmission window movement.

In the enhanced end-to-end ARQ method according to an embodiment of the disclosure, when intermediate wireless nodes (e.g., the wireless node 2 1*k*-02 and the wireless node 3 1*k*-03) receive the RLC status report, the intermediate wireless nodes may read and interpret the RLC status report. When the intermediate wireless nodes have data corresponding to an RLC SN whose successful delivery is confirmed in the RLC status report, the intermediate wireless nodes may discard the data, and when the intermediate wireless nodes have data corresponding to an RLC SN whose successful delivery is not confirmed, the intermediate wireless nodes may retransmit the data, and may reconfigure and deliver the RLC status report.

In an embodiment of the disclosure, when an intermediate wireless node reconfigures the RLC status report, the intermediate wireless node may update the retransmitted RLC SN to an ACK, instead of a NACK, and may send the RLC SN. Because the intermediate wireless node corrects information about the retransmitted RLC SN and reconfigures and delivers the RLC status report, a next intermediate wireless node or another wireless node may be prevented from performing unnecessary retransmission.

Also, according to the enhanced end-to-end ARQ method according to an embodiment of the disclosure, intermediate wireless nodes (e.g., the wireless node 2 1*k*-02 and the wireless node 3 1*k*-03) may drive a reception RLC window, may check an RLC SN for received data, may perform a loss detection function, may drive a timer when an RLC SN gap occurs, and may configure and deliver an RLC status report when the timer expires. Also, the intermediate wireless nodes may configure the RLC status report, may indicate whether delivery is successful, and may request the transmitting RLC layer device to perform retransmission and transmission window movement. However, the intermediate wireless nodes may not configure the RLC status report due to polling of an RLC header.

According to the enhanced end-to-end ARQ method of an embodiment of the disclosure, intermediate wireless nodes (e.g., the wireless node 2 1*k*-02 and the wireless node 3 1*k*-03) that perform an ARQ operation only between end wireless nodes and transmit/receive and deliver data between the end wireless nodes may perform a function of receiving and delivering data. In an embodiment of the disclosure, the intermediate wireless nodes may read and interpret an RLC status report in received data. When the intermediate wireless nodes have data corresponding to an RLC SN whose successful delivery is confirmed in the RLC status report, the intermediate wireless nodes may discard the data, and when the intermediate wireless nodes have data corresponding to an RLC SN whose successful delivery is not confirmed, the intermediate wireless nodes may perform retransmission and may reconfigure and deliver the RLC status report.

In an embodiment of the disclosure, when the intermediate wireless nodes reconfigure the RLC status report, the intermediate wireless nodes may update the retransmitted RLC SN to an ACK, instead of a NACK, and may send the RLC SN.

Also, when the intermediate wireless nodes receive data of an RLC layer device, the intermediate wireless nodes may read and interpret an RLC header, and may deliver again data (e.g., an RLC PDU) of the RLC layer device to a next parent wireless node or a next child wireless node. When a data division function is required due to the shortage of a transmission resource, the intermediate wireless nodes may reconfigure the RLC header by updating a field of the RLC header or adding a new field, may configure the RLC header along with the data, and may deliver the same to a next parent wireless node or a next child wireless node.

In an embodiment of the disclosure, the enhanced end-to-end ARQ method that is the fourth embodiment of the disclosure may have the following functions.

1. One ARQ function is performed between end wireless nodes transmitting/receiving data.

2. One RLC SN is allocated and used over all wireless links, and is shared in intermediate wireless links.

3. When an intermediate wireless node receiving data for each wireless link receives data, the intermediate wireless node reads and interprets an RLC header, and directly delivers again data (e.g., an RLC PDU) of an RLC layer device to a next parent wireless node or a next child wireless node.

4. When a data division function is required due to the shortage of a transmission resource, a wireless node reconfigures an RLC header by updating a field of a received RLC header or adding a new field, configures the RLC header along with data, and delivers the same to a next parent wireless node or a next child wireless node.

5. Each intermediate wireless node may read and interpret an RLC status report received from a parent wireless node or a child wireless node, and may reconfigure the RLC status report.

6. When each wireless node discards received data, the wireless node may read an RLC status report (e.g., an RLC status PDU) received from a parent wireless node (e.g., a parent IAB node) or a child wireless node (e.g., a child IAB node) and may discard only data whose successful delivery is confirmed (RLC ACK) in the RLC status report.

7. Even after each wireless node delivers data received from a parent wireless node (e.g., a parent IAB node) or a child wireless node (e.g., a child IAB node) to the child wireless node (e.g., the child IAB node) or the parent wireless node (e.g., the parent IAB node), the wireless node may store data, and when required, may perform retransmission.

8. When each wireless node reads and interprets an RLC status report received from a parent wireless node (e.g., a parent IAB node) or a child wireless node (e.g., a child IAB node) and stores data whose successful delivery is not confirmed (NACK) in the RLC status report, the wireless node may perform retransmission.

9. When each wireless node reads and interprets An RLC status report received from a parent wireless node (e.g., a parent IAB node) or a child wireless node (e.g., a child IAB node), stores data whose successful delivery is not confirmed (NACK) in the RLC status report, and performs retransmission, the wireless node may reconfigure or newly generate the RLC status report and may deliver the RLC status report to the child wireless node.

10. When each wireless node reads and interprets an RLC status report received from a parent wireless node (e.g., a parent IAB node) or a child wireless node (e.g., a child IAB node), stores data whose successful delivery is not confirmed (NACK) in the RLC status report, performs retransmission, and reconfigures or newly generates the RLC status report, the wireless node may set an ACK indicating successful delivery to the retransmitted data, instead of a NACK indicating unsuccessful delivery, and may deliver the data with the ACK to a next wireless node.

11. One RLC SN may be used and shared in all wireless links, and each wireless node may drive a reception RLC window and may perform loss detection. Also, the wireless node may drive a timer, and may configure an RLC status report. That is, instead of simply delivering data, each intermediate wireless node may read an RLC header of received data, may check an RLC SN, and may drive a reception RLC window, and may trigger a timer when an RLC SN gap occurs or may directly configure an RLC status report and may transmit the RLC status report to a wireless node that transmits the data. When the timer is triggered and data corresponding to RLC SNs corresponding to the RLC SN gap is not received until the timer expires, each intermediate wireless node may configure the RLC status report and may transmit the RLC status report to the wireless node that transmits the data. Also, the intermediate wireless node may send the RLC status report, and may request the wireless node that transmits the data to perform repaid retransmission.

12. An RLC status report may not be triggered and may not be configured by polling of a received RLC header.

13. Each wireless node may drive a reception RLC window, and after the timer expires or after an RLC status report is generated and transmitted to a transmitting wireless node, the wireless node may transmit data corresponding to an RLC SN received through retransmission from the transmitting wireless node to a next wireless node.

Referring to FIG. 11, an embodiment based on the enhanced end-to-end ARQ method that is the fourth embodiment of the disclosure will be described in more detail.

In the embodiment of the disclosure, for convenience of explanation, it is assumed that wireless nodes use an RLC SN having a 3-bit length in a network supporting wireless backhaul. That is, 0, 1, 2, 3, 4, 5, 6, and 7 may be allocated and used as RLC SNs, and a size of an RLC window may be 4 that is half a length of the RLC SNs.

First, a transmitting RLC layer device of the wireless node 1 1k-01 may allocate an RLC SN to each data received from an upper layer device. Also, the transmitting RLC layer device of the wireless node 1 1k-01 may transmit data corresponding to the RLC SNs 0, 1, 2, and 3 to a parent wireless node (e.g., the wireless node 2 1k-02) through a wireless link 1k-10.

In the above wireless link, it is assumed that data corresponding to the RLC SN 2 is lost. Because the wireless node 2 1k-02 that is an intermediate wireless node drives an RLC window and performs loss detection, when the wireless node 2 1k-02 receives data corresponding to the RLC SNs 0, 1, and 3, the wireless node 2 1k-02 may assume that data corresponding to the RLC SN 2 is lost and may trigger a timer. When data corresponding to the RLC SN 2 is not received until the timer expires, the wireless node 2 1*k*-02 may configure an RLC status report indicating that successful delivery of the RLC SNs 0, 1, 3, and 4 is confirmed and successful delivery of the RLC SN 2 is not confirmed and may request the wireless node 1 1*k*-01 for rapid retransmission (1*k*-25).

When the wireless node 1 1*k*-01 receives the RLC status report, the wireless node 1 1*k*-01 may move a transmission RLC window based on an RLC SN whose successful delivery is confirmed and may perform retransmission on the RLC SN 2 whose successful delivery is not confirmed (1*k*-30).

Data corresponding to the retransmitted RLC SN 2 may be delivered through the wireless node 2 1*k*-02 and the wireless node 3 1*k*-03 to the wireless node 4 1*k*-04 (1*k*-30, 1*k*-35, and 1*k*-40). When loss occurs again and a last wireless node successfully receiving data corresponding to the RLC SN 2 in a wireless link where loss occurs receives the RLC status report (NACK 2), retransmission may be performed again.

In an embodiment of the disclosure, the wireless node 2 1*k*-02 that is an intermediate wireless node may deliver again data corresponding to the received RLC SNs 0, 1, and 3 received in the wireless link 1*k*-10 to a parent wireless node (e.g., the wireless node 3 1*k*-03) through a wireless link 1*k*-15. The wireless node 3 1*k*-03 that is an intermediate wireless node may deliver again data corresponding to the received RLC SNs 0, 1, and 3 to a parent wireless node (e.g., the wireless node 4 1*k*-04) through a wireless link 1*k*-20.

In the link 1*k*-20, it is assumed that data corresponding to the RLC SN 1 is lost. A receiving RLC layer device of the wireless node 4 1*k*-04 receives data corresponding to the RLC SNs 0 and 3, may determine there is the probability that the RLC SNs 1 and 2 are lost, and may trigger a timer. When data corresponding to the RLC SNs 1 and 2 does not arrive until the timer expires, the receiving RLC layer device of the wireless node 4 1*k*-04 that is a parent wireless node may configure an RLC status report and may deliver the RLC status report to the wireless node 3 1*k*-03 that is an intermediate wireless node through a wireless link 1*k*-45. The RLC status report may include information having an ACK indicating that the RLC SNs 0 and 3 are successfully received and a NACK indicating that data corresponding to the RLC SNs 1 and 2 is not successfully received.

In an embodiment of the disclosure, the wireless node 3 1*k*-03 that is an intermediate wireless node may read and interpret the received RLC status report, and may read the information having the ACK indicating that data corresponding to the RLC SNs 0 and 3 are successfully received and the NACK indicating that data corresponding to the RLC SNs 1 and 2 is not successfully received (1*k*-25).

The wireless node 3 1*k*-03 may discard data corresponding to the RLC SNs 0 and 3 whose successful delivery is confirmed (ACK) based on RLC status report information. Also, the wireless node 3 1*k*-03 and may retransmit data corresponding to the RLC SN 1 stored in the wireless node 3 1*k*-03 from among the RLC SNs 1 and 2 whose successful delivery is not confirmed (NACK) to the wireless node 4 1*k*-04 (1*k*-45). The wireless node 3 1*k*-03 may reconfigure or newly configure the received RLC status report. That is, the reconfigured or newly configured RLC status report may include information having an ACK indicating that the RLC SNs 0, 1, and 3 are successfully received and a NACK indicating that data corresponding to the RLC SN 2 is not successfully received. The reconfigured or newly configured RLC status report may be delivered to the wireless node 2 1*k*-02 that is a next wireless node (1*k*-50).

The wireless node 2 1*k*-02 that is an intermediate wireless node may read and interpret the received RLC status report, and may read the information having the ACK indicating that data corresponding to the RLC SNs 0, 1, and 3 are successfully received and the NACK indicating that data corresponding to the RLC SN 2 is not successfully received (1*k*-50).

The wireless node 2 1*k*-02 may discard data corresponding to the RLC SNs 0, 1, and 3 whose successful delivery is confirmed (ACK) based on RLC status report information. Also, the wireless node 2 1*k*-02 may retransmit data corresponding to the RLC SN 2 because the RLC SN 2 whose successful delivery is not confirmed (NACK) is data stored in the wireless node 2 1*k*-02. The wireless node 2 1*k*-02 may indicate that successful delivery of data corresponding to the RLC SNs 0, 1, 2, and 3 is confirmed in the RLC status report and may deliver the RLC status report to the wireless node 1 1*k*-01 (1*k*-55). The wireless node 1 1*k*-01 may read information of the RLC status report, may move a transmission RLC window, and may transmit data corresponding to the RLC SNs 4, 5, and 6 as new transmission to the wireless node 2 1*k*-02 (1*k*-60). The above procedures may be similarly performed in 1*k*-65, 1*k*-70, 1*k*-75, 1*k*-80, 1*k*-85, and 1*k*-90.

As described above, in the enhanced end-to-end ARQ method according to the fourth embodiment of the disclosure, intermediate wireless nodes may perform a function of delivering received data. Also, the intermediate wireless nodes may read and interpret a received RLC status report, and may discard whose successful delivery is confirmed and that is stored therein and may retransmit data whose successful delivery is not confirmed and that is stored therein. When the retransmission is performed, the intermediate wireless nodes may reconfigure or newly configure the received RLC status report and may deliver the RLC status report.

In an embodiment of the disclosure, each wireless node may drive a reception RLC window, may perform loss detection, may drive a timer, and may configure an RLC status report. That is, instead of simply delivering data, each intermediate wireless node may read an RLC header of received data, may check an RLC SN, and may drive a reception RLC window, and may trigger a timer when an RLC SN gap occurs or may directly configure an RLC status report and may transmit the RLC status report to a wireless node that transmits the data.

When the timer is triggered, when data corresponding to RLC SNs corresponding to the RLC SN gap is not received until the timer expires, each wireless node may configure the RLC status report and may transmit the RLC status report to the wireless node that transmits the data. In this case, each wireless node may send the RLC status report, and may request the wireless node that transmits the data to perform repaid retransmission. According to the fourth embodiment of the disclosure, in a wireless backhaul network, a complexity of wireless nodes may be reduced, rapid retransmission may be performed, and a transmission window may be rapidly moved.

In the first embodiment, the second embodiment, the third embodiment, and the fourth embodiment of the disclosure, wireless nodes may consider an operation regarding retransmitted data and an RLC status report as highest priority. That is, the wireless nodes may first perform the operation regarding the retransmitted data and transmit the retransmitted data and the RLC status report. When the retransmitted data arrives late, the movement of a reception RLC window is delayed, and when the RLC status report arrives late, the movement of a transmission RLC window is delayed. Accordingly, the wireless nodes may apply high priority to the retransmitted data and the RLC status report and may rapidly transmit and deliver the retransmitted data and the RLC status report.

Figure 12:
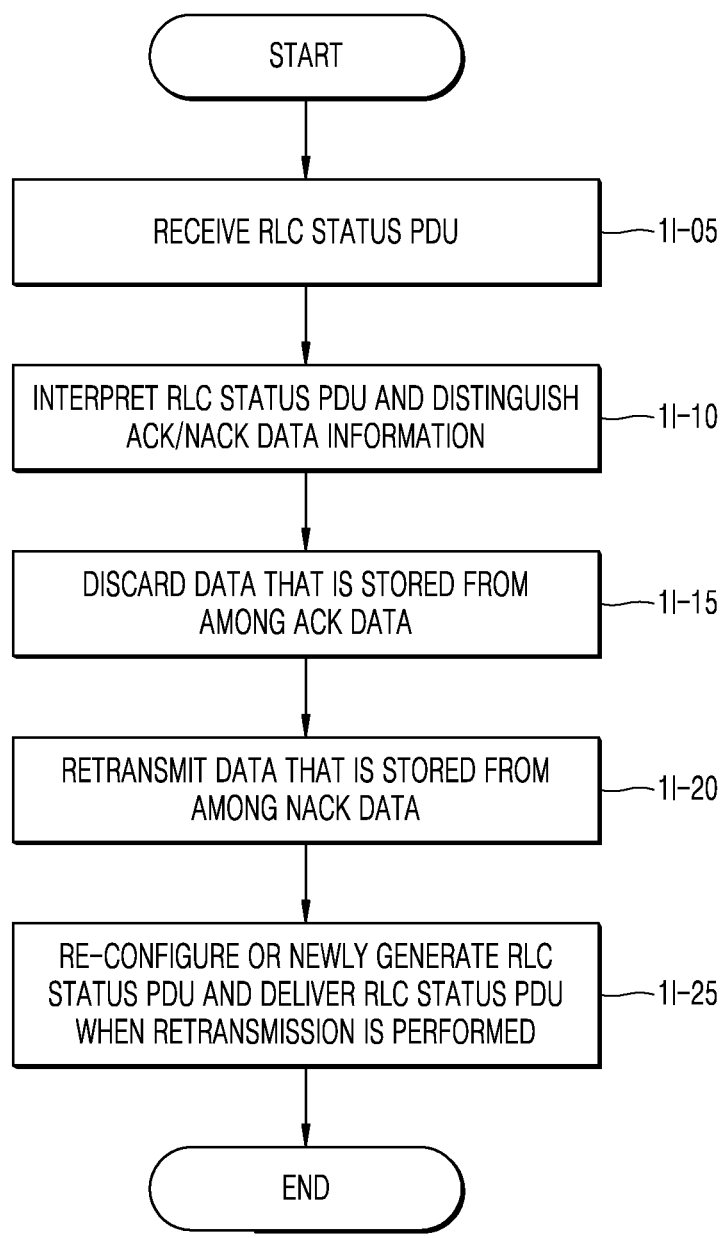
FIG. 12 is a flowchart illustrating an operation of an intermediate wireless node according to an embodiment of the disclosure.

FIG. 12 is a flowchart illustrating an operation of an intermediate wireless node according to an embodiment of the disclosure.

More particularly, FIG. 12 is a flowchart illustrating an operation of an intermediate wireless node according to the third embodiment and the fourth embodiment of the disclosure.

In a next-generation mobile communication system supporting wireless backhaul according to an embodiment of the disclosure, an end-to-end ARQ method may be set and used.

In operation 1*l*-05, intermediate wireless nodes may receive an RLC status report (e.g., an RLC status PDU).

In operation 1*l*-10, the intermediate wireless nodes may read and interpret the RLC status report and may distinguish data whose successful delivery is confirmed (ACK) and data whose successful delivery is not confirmed (NACK).

In operation 1*l*-15, when the intermediate wireless nodes store data whose successful delivery is confirmed, the intermediate wireless nodes may discard the data whose successful delivery is confirmed.

In operation 1*l*-20, when the intermediate wireless nodes store some of data whose successful delivery is not confirmed, the intermediate wireless nodes may perform retransmission.

In operation 1*l*-25, when the intermediate wireless nodes store some of data whose successful delivery is not confirmed and perform retransmission, the intermediate wireless nodes may reconfigure or newly generate the RLC status report and may deliver the RLC status report to a next wireless node.

For example, the intermediate wireless nodes may reconfigure or newly generate the RLC status report by maintaining information about the data whose successful delivery is confirmed in the received RLC status report, and changing information to indicate that successful delivery of data retransmitted by the intermediate wireless nodes from among the data whose successful delivery is not confirmed is confirmed.

In an embodiment of the disclosure, RLC data or an RLC PDU may include an RLC data PDU (e.g., general data) and an RLC control PDU (e.g., an RLC status report).

In an embodiment of the disclosure, a procedure and a method according to the third embodiment and the fourth embodiment of the disclosure may also be applied to a hop-by-hop ARQ method of the first embodiment of the disclosure as well as an end-to-end ARQ method of the second embodiment of the disclosure.

In an embodiment of the disclosure, when a wireless link connection failure occurs between IAB nodes in a hop-by-hop ARQ method, data loss may occur. For example, referring to FIG. 5, the wireless node 3 1*e*-03 may transmit an RLC ACK as an RLC status report for first data to the terminal 2 1*e*-07. In this case, the terminal 2 1*e*-07 may determine that the first data is successfully delivered and may not perform retransmission. However, when a wireless link connection failure occurs between the wireless node 3 1*e*-03 and the wireless node 2 1*e*-02 or when congestion occurs in the wireless node 3 1*e*-03 and data is lost or discarded, that is, for example, when the first data is lost, the wireless node 1 1*e*-01 that is an uppermost wireless node may not receive the first data unless the terminal 2 1*e*-07 retransmits the first data, thereby leading to data loss.

Accordingly, in order to solve the data loss, a procedure and a method according to the third embodiment and the fourth embodiment of the disclosure may be used. For example, when wireless nodes use a hop-by-hop ARQ method, the wireless nodes may indicate an RLC ACK to a child node only for data having an RLC ACK in an RLC status report received from a parent wireless node and may send the RLC status report.

For example, when the terminal 2 1*e*-07 sends uplink data to an uppermost wireless node (or when the uppermost wireless node sends downlink data to the terminal 2 1*e*-07, each wireless node may indicate an RLC ACK to a child node only for data having an RLC ACK in an RLC status report received from a parent node and may send the RLC status report.

That is, because each wireless node indicates an RLC ACK to a child wireless node only for data having an RLC ACK from an uppermost node (or a terminal) in an RLC status, when data is lost in the middle, an RLC ACK may be prevented from being indicated for the lost data.

In contrast, when an RLC SN gap occurs, a timer expires, and loss is confirmed, each wireless node may indicate an RLC NACK regardless of information (e.g., an ACK or a NACK) indicated in an RLC status report of a parent wireless node, may send the RLC status report, and may request for retransmission.

Accordingly, in order to indicate an RLC ACK for first data in a hop-by-hop ARQ method, each wireless node may have to first receive the RLC ACK for the first data from a parent wireless node (or a terminal or an uppermost wireless node). Although the wireless node successfully receives the first data, the wireless node may delay RLC ACK indication until the wireless node receives the RLC ACK for the first data from the parent wireless node (or the terminal or the uppermost wireless node). That is, because data loss may occur in an intermediate wireless node, the wireless node may delay ACK indication for an RLC status report until successful delivery is confirmed from an end wireless node (or a terminal or an uppermost wireless node), and may indicate a NACK for data whose successful delivery is not confirmed and may request for rapid retransmission.

In other words, as described with reference to the third embodiment and the fourth embodiment of the disclosure, each wireless node may read an RLC status report. Each wireless node may reflect read RLC status report information, may retransmit data for which a NACK is indicated and may deliver information about data for which an ACK is indicated to a child wireless node or a parent wireless node, and may reconfigure or newly configure the RLC status report. Also, in a hop-by-hop ARQ method, because different independent RLC SNs may be used in wireless links, in order to distinguish data delivered to the wireless links, each wireless node may implement a mapping table showing a mapping relationship between RLC SNs according to links allocated to data.

For example, it is assumed an RLC SN 1 is allocated to first data in a wireless link 1 between the terminal 2 1*e*-07 and the wireless node 1 1*e*-01. Also, it is assumed that an RLC SN 5 is allocated to first data in a wireless link 2 between the wireless node 1 1*e*-01 and the wireless node 2 1*e*-02.

In this case, the wireless node 1 1*e*-01 may implement a mapping table showing a mapping relationship in which the RLC SN 1 is allocated to the first data in the wireless link 1 and the RLC SN 5 is allocated to the first data in the wireless link 2. Accordingly, when the wireless node 1 1e-01 receives an RLC ACK for the RLC SN 5 from the wireless node 2 1e-02, the wireless node 1 1e-01 may interpret that RLC ACK information means an RLC ACK for the RLC SN 1 of the wireless link 1.

As described above, a procedure and a method according to the third embodiment and the fourth embodiment of the disclosure may also be applied to a hop-by-hop ARQ method according to the first embodiment of the disclosure. In this case, data loss which may occur in an intermediate wireless node using the hop-by-hop ARQ method may be recovered by retransmission performed by an end wireless node.

Figure 13:
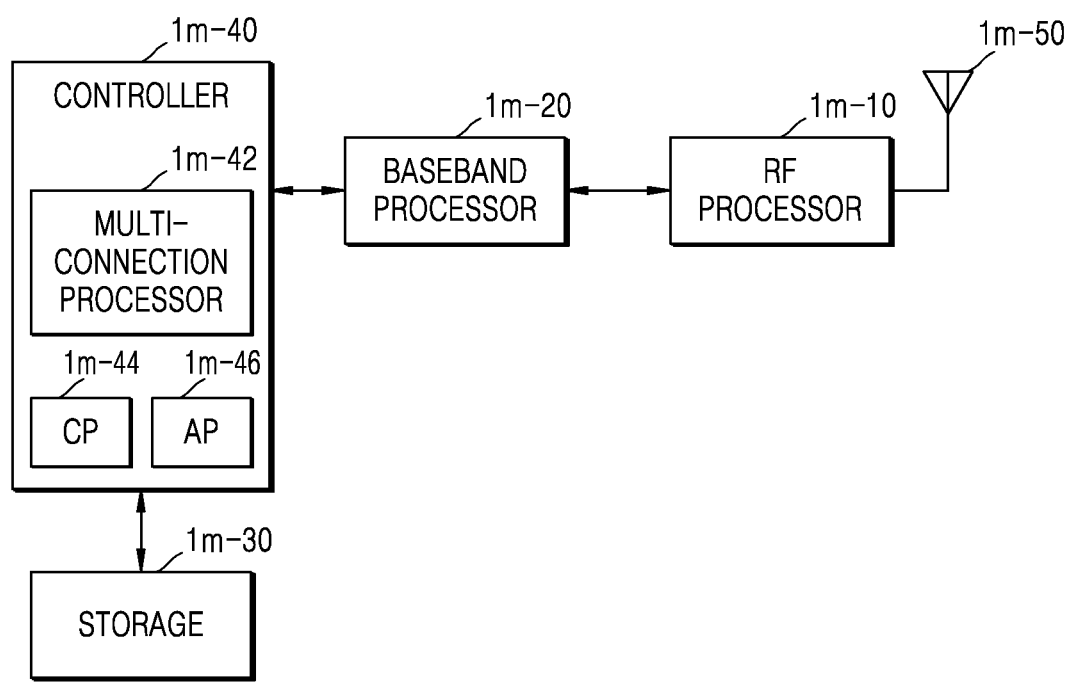
FIG. 13 is a block diagram illustrating a structure of a terminal or a wireless node according to an embodiment of the disclosure.

FIG. 13 is a block diagram illustrating a structure of a terminal or a wireless node according to an embodiment of the disclosure.

Referring to FIG. 13, the terminal includes a radio frequency (RF) processor 1m-10, a baseband processor 1m-20, a storage 1m-30, and a controller 1m-40.

The RF processor 1m-10 may perform a function for transmitting/receiving a signal through a wireless channel such as band conversion or amplification of the signal. That is, the RF processor 1m-10 may up-convert a baseband signal applied from the baseband processor 1m-20 into an RF band signal and may transmit the RF band signal through an antenna 1m-50, and may down-convert the RF band signal received through the antenna 1m-50 into a baseband signal. For example, the RF processor 1m-10 may include a transmission filter, a reception filter, an amplifier, a mixer, an oscillator, a digital-to-analog converter (DAC), or an analog-to-digital converter (ADC). Although only one antenna 1m-50 is illustrated in FIG. 13, the terminal may include a plurality of antennas. Also, the RF processor 1m-10 may include a plurality of RF chains. Furthermore, the RF processor 1m-10 may perform beamforming. For the beamforming, the RF processor 1m-10 may adjust a phase and a level of each of signals transmitted/received through a plurality of antennas or antenna elements. Also, the RF processor 1m-10 may perform multiple-input and multiple-output (MIMO), and may receive a plurality of layers during a MIMO operation. The RF processor 1m-10 may perform reception beam sweeping by appropriately configuring a plurality of antennas or antenna elements under the control of the controller 1m-40, or may adjust a direction and a width of a received beam so that the received beam is synchronized with a transmitted beam.

The baseband processor 1m-20 may perform conversion between a baseband signal and a bit string according to the physical layer standard of a system. For example, during data transmission, the baseband processor 1m-20 may generate complex symbols by encoding and modulating a transmitted bit string. Also, during data reception, the baseband processor 1m-20 may restore a received bit string by demodulating and decoding a baseband signal applied from the RF processor 1m-10. For example, according to an OFDM method, during data transmission, the baseband processor 1m-20 may generate complex symbols by encoding and modulating a transmitted bit string, may map the complex symbols to subcarriers, and may configure OFDM symbols through an inverse fast Fourier transform (IFFT) operation and cyclic prefix insertion. Also, during data reception, the baseband processor 1m-20 may divide a baseband signal applied from the RF processor 1m-10 in the unit of OFDM symbols, may restore the signals mapped to the subcarriers through a fast Fourier transform (FFT) operation, and may restore a received bit string through demodulation and decoding.

The baseband processor 1m-20 and the RF processor 1m-10 transmit and receive signals as described above. Accordingly, the baseband processor 1m-20 and the RF processor 1m-10 may be referred to as a transmitter, a receiver, a transceiver, or a communicator. Furthermore, at least one of the baseband processor 1m-20 or the RF processor 1m-10 may include a plurality of communication modules to support different wireless access technologies. Also, at least one of the baseband processor 1m-20 or the RF processor 1m-10 may include different communication modules to process signals of different frequency bands. For example, the different wireless access technologies may include an LTE network and an NR network. Also, the different frequency bands may include a super high frequency (SHF) (e.g., 2.2 GHz or 2 GHz) band and a millimeter wave (e.g., 60 GHz) band. A terminal may transmit/receive a signal to/from a BS by using the baseband processor 1m-20 and the RF processor 1m-10. The signal may include control information and data.

The storage 1m-30 may store data such as a basic program for an operation of the terminal, an application program, and configuration information. The storage 1m-30 may provide stored data according to a request of the controller 1m-40. The storage 1m-30 may include a storage medium such as a read-only memory (ROM), a random-access memory (RAM), a hard disc, a compact disc (CD)-ROM, or a digital versatile disc (DVD) or a combination thereof. Also, the storage 1m-30 may include a plurality of memories. In an embodiment of the disclosure, the storage 1m-30 may store a program for supporting beam-based cooperative communication.

The controller 1m-40 controls overall operations of the terminal. For example, the controller 1m-40 may transmit/receive a signal through the baseband processor 1m-20 and the RF processor 1m-10. Also, the controller 1m-40 may record or read data to or from the storage 1m-30. To this end, the controller 1m-40 may include at least one processor. For example, the controller 1m-40 may include a multi-connection processor 1m-42 configured to control multiple connections, a communication processor (CP) 1m-44 that performs control for communication and an application processor (AP) 1m-46 that controls an upper layer such as an application program.

Figure 14:
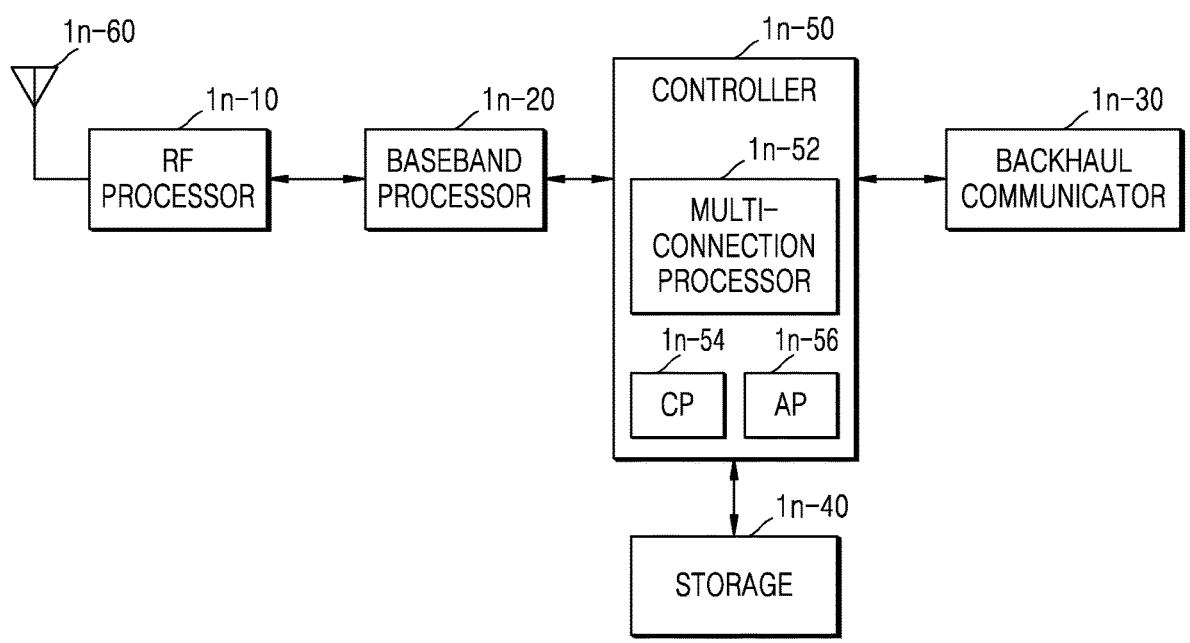
FIG. 14 is a block diagram illustrating a configuration of a transmission/reception point (TRP) or a wireless node in a wireless communication system according to an embodiment of the disclosure.

FIG. 14 is a block diagram illustrating a configuration of a transmission/reception point (TRP), a BS, or a wireless node in a wireless communication system according to an embodiment of the disclosure.

Referring to FIG. 14, the BS includes an RF processor 1n-10, a baseband processor 1n-20, a backhaul communicator 1n-30, a storage 1n-40, and a controller 1n-50.

The RF processor 1n-10 may perform a function for transmitting/receiving a signal through a wireless channel such as band conversion or amplification of the signal. That is, the RF processor 1n-10 may up-convert a baseband signal applied from the baseband processor 1n-20 into an RF band signal and may transmit the RF band signal through an antenna 1n-60, and may down-convert the RF band signal received through the antenna into a baseband signal. For example, the RF processor 1n-10 may include a transmission filter, a reception filter, an amplifier, a mixer, an oscillator, a DAC, or an ADC. Although only one antenna 1n-60 is illustrated in FIG. 14, a first access node may include a plurality of antennas. Also, the RF processor 1n-10 may include a plurality of RF chains. Furthermore, the RF processor 1n-10 may perform beamforming. For the beamforming, the RF processor 1n-10 may adjust a phase and a level of each of signals transmitted/received through a plurality of antennas or antenna elements. The RF processor 1n-10 may perform a down MIMO operation by transmitting one or more layers.

The baseband processor 1n-20 may perform conversion between a baseband signal and a bit string according to the physical layer standard of a first wireless access technology. For example, during data transmission, the baseband processor 1n-20 may generate complex symbols by encoding and modulating a transmitted bit string. Also, during data reception, the baseband processor 1n-20 may restore a received bit string by demodulating and decoding a baseband signal applied from the RF processor 1n-10. For example, according to an OFDM method, during data transmission, the baseband processor 1n-20 may generate complex symbols by encoding and modulating a transmitted bit string, may map the complex symbols to subcarriers, and may configure OFDM symbols through an IFFT operation and cycle prefix insertion. Also, during data reception, the baseband processor 1n-20 may divide a baseband signal applied from the RF processor 1n-10 in the unit of OFDM symbols, may restore the signals mapped to the subcarriers through an FFT operation, and may restore a received bit string through demodulation and decoding. The baseband processor 1n-20 and the RF processor 1n-10 transmit and receive signals as described above. Accordingly, the baseband processor 1n-20 and the RF processor 1n-10 may be referred to as a transmitter, a receiver, a transceiver, a communicator, or a wireless communicator.

The backhaul communicator 1n-30 may provide an interface for performing communication with other nodes in a network. The BS may transmit/receive a signal to/from a terminal by using the baseband processor 1n-20 and the RF processor 1n-10. The signal may include control information and data.

The storage 1n-40 may store data such as a basic program for an operation of the main BS, an application program, or configuration information. In particular, the storage 1n-40 may store information about a bearer allocated to a connected terminal, a measurement result reported from the connected terminal, etc. Also, the storage 1n-40 may store information that becomes a basis of determination whether to provide or suspend multi-connection to the terminal. The storage 1n-40 may provide stored data according to a request of the controller 1n-50. The storage 1n-40 may include a storage medium such as a ROM, a RAM, a hard disc, a CD-ROM, or a DVD or a combination thereof. Also, the storage 1n-40 may include a plurality of memories. In an embodiment of the disclosure, the storage 1n-40 may store a program for supporting beam-based cooperative communication.

The controller 1n-50 controls overall operations of the main BS. For example, the controller 1n-50 may transmit/receive a signal through the baseband processor 1n-20 and the RF processor 1n-10 or the backhaul communicator 1n-30. Also, the controller 1n-50 may record or read data to or from the storage 1n-40. To this end, the controller 1n-50 may include at least one processor. For example, the controller 1n-50 may include a multi-connection processor 1n-52 configured to control multiple connections, a CP 1n-54 that performs control for communication and an AP 1n-56 that controls an upper layer such as an application program.

Methods according to claims of the disclosure and/or various embodiments described in the specification of the disclosure may be implemented as hardware, software, or combination of hardware and software.

When a method is implemented by software, a non-transitory computer-readable storage medium for storing one or more programs (software modules) may be provided. The one or more programs stored in the non-transitory computer-readable storage medium are configured to be executed by one or more processors in an electronic device. The one or more programs include instructions for allowing the electronic device to perform the methods according to the claims of the disclosure or the embodiments described in the specification of the disclosure.

The programs (software modules and software) may be stored in a RAM, a non-volatile memory including a flash memory, a ROM, an electrically erasable programmable read-only memory (EEPROM), a magnetic disc storage device, a CD-ROM, a DVD, another optical storage device, or a magnetic cassette. Alternatively, the programs may be stored in a memory configured by combining some or all of them. Also, the configured memory may include a plurality of memories.

Also, the programs may be stored in an attachable storage device accessible through a communication network such as the Internet, an intranet, a local area network (LAN), a wide LAN (WLAN), or a storage area network (SAN) or a combination thereof. This storage device may access a device according to various embodiments of the disclosure through an external port. Also, a separate storage device on a communication network may access a device according to various embodiments of the disclosure.

In specific embodiments of the disclosure described above, components included in the disclosure were expressed singular or plural in accordance with the specific embodiments. However, singular or plural representations are selected appropriately for the sake of convenience of description, the disclosure is not limited to the singular or plural constituent elements, and even expressed as a singular element, it may be composed of plural elements, and vice versa.

While the disclosure has been shown and described with reference to various embodiments thereof, it will be understood by those skilled in the art that various changes in form and details may be made therein without departing from the spirit and scope of the disclosure as defined by the appended claims and their equivalents. Also, two or more of the embodiments of the disclosure may be combined. For example, parts of an embodiment and another embodiment of the disclosure may be combined with each other to operate a BS and a terminal. Also, although various embodiments of the disclosure are described based on frequency division duplex (FDD) LTE systems, modifications based on the technical scope of the embodiments may be applied to other communication systems such as time division duplex (TDD) LTE systems and 5G systems.

What is claimed is:

1. A method for transmitting data in wireless Backhaul system, performed by an integrated access backhaul (TAB) node, the method comprising:
  receiving a RRCconnectionReconfiguration message from a parent node, the RRCconnectionReconfiguration message comprising a Radio Link Control (RLC) channel identifier and at least one of backhaul adaptation layer address of the TAB node or backhaul adaptation layer identifier of the TAB node;
  based on the RRCconnectionReconfiguration message, establishing a Backhaul (BH) RLC channel between the TAB node and the parent node;
  in backhaul adaptation layer, mapping at least one data to the BH RLC channel based on the RLC channel identifier, wherein the BH RLC channel is configured with QoS (Quality of Service); and transmitting the mapped at least one data to the parent node, via the BH RLC channel.

2. The method of claim 1, wherein the at least one data is mapped to the BH RLC channel, based on the at least one of:

backhaul adaptation layer address, or backhaul adaptation layer identifier.

3. The method of claim 1, wherein the RRCconnectionReconfiguration message comprises an indicator indicating to set backhaul adaptation header, and wherein the backhaul adaptation header is included in the mapped at least one data and comprises at backhaul adaptation layer address.

4. The method of claim 1, wherein the IAB node independently perform hop by hop Automatic Repeat Request (ARQ).

5. The method of claim 1, wherein, after receiving a RLC ACK for a data from the parent node, the IAB node perform end to end Automatic Repeat Request (ARQ) which transmit a RLC ACK (acknowledgement) for the data.

6. The method of claim 1, wherein the RRCconnectionReconfiguration message comprises a backhaul channel identifier, and wherein the backhaul channel identifier is used to configure the BH RLC channel between the IAB node and the parent node.

7. An apparatus for transmitting data in wireless Backhaul system, the apparatus comprising:

a transceiver; and at least one processor coupled with the transceiver and configured to:

receive a RRCconnectionReconfiguration message from a parent node, the RRCconnectionReconfiguration message comprising a Radio Link Control (RLC) channel identifier and at least one of backhaul adaptation layer address of apparatus or backhaul adaptation layer identifier of apparatus, based on the RRCconnectionReconfiguration message, establish a Backhaul (BH) RLC channel between the apparatus and the parent node, in backhaul adaptation layer, map at least one data to the BH RLC channel based on the RLC channel identifier, wherein the BH RLC channel is configured with QoS (Quality of Service), and transmit the mapped at least one data to the parent node, via the BH RLC channel.

8. The apparatus of claim 7, wherein the at least one data is mapped to the BH RLC channel, based on the at least one of:

backhaul adaptation layer address, or backhaul adaptation layer identifier.

9. The apparatus of claim 7, wherein the RRCconnectionReconfiguration message comprises an indicator indicating to set backhaul adaptation header, and wherein the backhaul adaptation header is included in the mapped at least one data and comprises at backhaul adaptation layer address.

10. The apparatus of claim 7, wherein the at least one processor further configured to: independently perform hop by hop Automatic Repeat Request (ARQ).

11. The apparatus of claim 7, wherein, after receiving a RLC ACK for a data from the parent node, the at least one processor further configured to: perform end to end ARQ which transmit a RLC ACK (acknowledgement) for the data.

12. The apparatus of claim 7, wherein the RRCconnectionReconfiguration message comprises a backhaul channel identifier, and wherein the backhaul channel identifier is used to configure the BH RLC channel between the apparatus and the parent node.

* * * * *